US00RE48447E

(19) United States
(12) Reissued Patent
Kozuka et al.

(10) Patent Number: US RE48,447 E
(45) Date of Reissued Patent: Feb. 23, 2021

(54) WEARABLE TERMINAL AND METHOD FOR CONTROLLING THE SAME

(71) Applicant: Panasonic Intellectual Property Corporation of America, Torrance, CA (US)

(72) Inventors: Masayuki Kozuka, Osaka (JP); Tohru Wakabayashi, Hyogo (JP); Shingo Matsumoto, Tokyo (JP)

(73) Assignee: Panasonic Intellectual Property Corporation of America, Torrance, CA (US)

(21) Appl. No.: 15/970,163

(22) Filed: May 3, 2018

Related U.S. Patent Documents

Reissue of:
(64) Patent No.: 9,329,695
Issued: May 3, 2016
Appl. No.: 14/504,232
Filed: Oct. 1, 2014

U.S. Applications:
(60) Provisional application No. 61/887,083, filed on Oct. 4, 2013.

(30) Foreign Application Priority Data

Jul. 16, 2014 (JP) ..... 2014-145990

(51) Int. Cl.
*G10L 17/22* (2013.01)
*G10L 15/22* (2006.01)
*G06F 3/01* (2006.01)

(52) U.S. Cl.
CPC ..... *G06F 3/017* (2013.01); *G06F 3/014* (2013.01); *G10L 2015/223* (2013.01); *G10L 2015/226* (2013.01)

(58) Field of Classification Search
CPC ..... G06F 3/017; G06F 3/167; G06F 3/014
See application file for complete search history.

(56) References Cited

U.S. PATENT DOCUMENTS 7,173,604 B2 * 2/2007 Marvit ..... G06F 3/017 345/156
7,418,281 B2 * 8/2008 Guyette ..... H04M 1/72533 345/169

(Continued)

FOREIGN PATENT DOCUMENTS

JP 2003-116182 4/2003
JP 2012-508530 4/2012

(Continued)

*Primary Examiner* — Colin M LaRose
(74) *Attorney, Agent, or Firm* — Wenderoth, Lind & Ponack, L.L.P.

(57) ABSTRACT

A wearable terminal includes voice data generation unit a voice data generation unit configured to generate audio data, a sensing unit configured to sense a motion of a user's upper limb in a first axis direction perpendicular to a plane defined by a vertically downward oriented direction of the upper limb and a direction of movement of the user, and to generate motion data concerning the motion, a determination unit configured to determine, based on the motion data, whether or not the user is going to perform remote control of a home electric appliance, and a data processing unit configured to process the audio data. The data processing unit includes a transmission data generation unit configured to generate transmission data corresponding to the audio data if the determination unit determines that the user is going to perform the remote control, and a transmission unit configured to transmit the transmission data to a network.

10 Claims, 27 Drawing Sheets

(56) References Cited

U.S. PATENT DOCUMENTS

| | | | | |
|---|---|---|---|---|
| 8,112,281 | B2 * | 2/2012 | Yeung | G04C 3/002 704/270 |
| 8,344,998 | B2 * | 1/2013 | Fitzgerald | G06F 1/3203 345/156 |
| 8,843,173 | B2 * | 9/2014 | Lee | G06F 1/3206 455/550.1 |
| 8,886,541 | B2 * | 11/2014 | Friedlander | H04L 17/02 704/270 |
| 9,189,062 | B2 * | 11/2015 | Janefalkar | G06F 1/1694 |
| 9,390,714 | B2 * | 7/2016 | Kim | G10L 15/24 |
| 9,477,313 | B2 * | 10/2016 | Mistry | G06F 3/014 |
| 9,710,056 | B2 * | 7/2017 | Johnson | G06F 3/012 |
| 9,729,687 | B2 * | 8/2017 | Hsieh | G06F 1/1643 |
| 2012/0313746 | A1 * | 12/2012 | Rahman | A61B 5/0024 340/5.1 |
| 2013/0046505 | A1 * | 2/2013 | Brunner | G01C 21/165 702/141 |
| 2015/0092520 | A1 * | 4/2015 | Robison | G04G 21/02 368/9 |

FOREIGN PATENT DOCUMENTS

| | | |
|---|---|---|
| JP | 2013-179446 | 9/2013 |
| WO | 2010/054373 | 5/2010 |
| WO | 2013/128999 | 9/2013 |
| WO | 2014/185808 | 11/2014 |
| WO | WO 2014185808 A1 * | 11/2014 |

* cited by examiner

FIG. 18

| CANDIDATE DESTINATION | PRIORITY (AWAY FROM HOME) | PRIORITY (IN VEHICLE) | PRIORITY (AT HOME) |
|---|---|---|---|
| (1) SMARTPHONE A | FIRST PLACE | OFF | THIRD PLACE |
| (2) SMARTPHONE B | SECOND PLACE | OFF | OFF |
| (3) CAR NAVIGATION SYSTEM | OFF | FIRST PLACE | OFF |
| (4) TELEVISION SET | OFF | OFF | FIRST PLACE |
| (5) HOME GATEWAY | OFF | OFF | SECOND PLACE |

| OPERATION TARGET | PRIORITY |
|---|---|
| WEARABLE TERMINAL | — |
| SMARTPHONE | SECOND PLACE |
| HOME ELECTRIC APPLIANCE NETWORK | FIRST PLACE |

FIG. 25

| OPERATION TARGET DEVICE | PRIORITY (AWAY FROM HOME) | PRIORITY (IN VEHICLE) | PRIORITY (AT HOME) |
|---|---|---|---|
| (1) SMARTPHONE | FIRST PLACE | OFF | THIRD PLACE |
| (2) CAR NAVIGATION SYSTEM | SECOND PLACE | FIRST PLACE | OFF |
| (3) TELEVISION SET | OFF | OFF | FIRST PLACE |
| (4) AIR CONDITIONER (1) | FOURTH PLACE | OFF | OFF |
| (5) AIR CONDITIONER (2) | OFF | OFF | SECOND PLACE |
| (6) HOME GATEWAY | THIRD PLACE | OFF | OFF |
| (7) WASHING MACHINE | OFF | OFF | OFF |

FIG. 26

| TARGET OF CONTROL | OPERATION TO PERFORM |
|---|---|
| (1) WEARABLE TERMINAL | TURNING ON OF POWER BUTTON |
| (2) SMARTPHONE | OPERATION OF TOUCH PANEL |
| (3) HOME ELECTRIC APPLIANCE | MOVEMENT OF UPPER LIMB |

WEARABLE TERMINAL AND METHOD FOR CONTROLLING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue of U.S. Pat. No. 9,329,695, which issued on May 3, 2016 from application Ser. No. 14/504,232, which claims the benefit of U.S. Provisional Application No. 61/887,083, filed Oct. 4, 2013.*

BACKGROUND OF THE INVENTION

1. Field of the Invention

The present disclosure relates to a wearable terminal usable in a system which allows remote control of home electric appliances via a network by using voice instructions, and a method for controlling the wearable terminal.

2. Description of the Related Art

Recent advancements in communication technology enable remote control of a home electric appliance by using voice instructions given by a user (see Japanese Unexamined Patent Application Publication No. 2013-179446). According to Japanese Unexamined Patent Application Publication No. 2013-179446 (hereinafter referred to as Patent Literature 1), a user gives voice instructions to a control device configured to control home electric appliances. The control device transfers the voice instructions to a server. The server applies a speech analysis process to the voice instructions, and generates a control signal for controlling a home electric appliance. The control signal is transmitted from the server to the home electric appliance. Accordingly, the home electric appliance can be operated in accordance with the voice instructions given by the user.

Patent Literature 1 teaches that a smartphone is available as the control device described above. A user often has a smartphone tucked in a bag. The user takes the smartphone out of the bag when using the smartphone as the control device described above.

Patent Literature 1 also discloses a control device configured to provide remote control of a home electric appliance by using a gesture instead of using voice instructions. Patent Literature 1 teaches that a watch-type wearable terminal is available as the control device. Using a wearable terminal as the control device described above allows a user to give gesture-based control instructions to the wearable terminal in real time.

SUMMARY OF THE INVENTION

However, further improvements are needed in the technique disclosed in Patent Literature 1.

In one general aspect, the techniques disclosed here feature a wearable terminal configured to be wearable on an upper limb of a user and usable in a system for allowing remote control of a home electric appliance via a network by using voice instructions. The wearable terminal includes voice data generation unit a voice data generation unit configured to generate audio data from the voice instructions, a sensing unit configured to sense a motion of the upper limb in a first axis direction perpendicular to a plane defined by a vertically downward oriented direction of the upper limb and a direction of movement of the user, and to generate motion data concerning the motion, a determination unit configured to determine, based on the motion data, whether or not the user is going to perform remote control of the home electric appliance, and a data processing unit configured to process the audio data. The data processing unit includes (i) a transmission data generation unit configured to generate transmission data corresponding to the audio data in a case where the determination unit determines that the user is going to perform remote control of the home electric appliance, and (ii) a transmission unit configured to transmit the transmission data to the network.

According to the aspect described above, the sensing unit generates motion data concerning a motion of a user's upper limb in a first axis direction perpendicular to a plane defined by a vertically downward oriented direction of the upper limb and a direction of movement of the user. Thus, the determination unit may be able to accurately determine whether or not the user is going to perform remote control of a home electric appliance. When the determination unit determines, based on the motion data, that the user is going to perform remote control of the home electric appliance, the transmission data generation unit generates transmission data corresponding to audio data. Accordingly, the remote control of the home electric appliance may be achieved with accuracy and ease.

These general and specific aspects may be implemented using a system, a method, and a computer program, and any combination of systems, methods, and computer programs.

In an aspect, the present disclosure enables a user's easy and accurate remote control of home electric appliances.

BRIEF DESCRIPTION OF THE DRAWINGS

FIG. 18 is a table showing priorities set in the cloud server (fifteenth embodiment);

FIG. 25 is a table showing priorities set in the cloud server; and

FIG. 26 is a table for associating targets to be controlled by the cloud server with operations performed by the user (twentieth embodiment).

DESCRIPTION OF THE PREFERRED EMBODIMENTS

Figure 1:
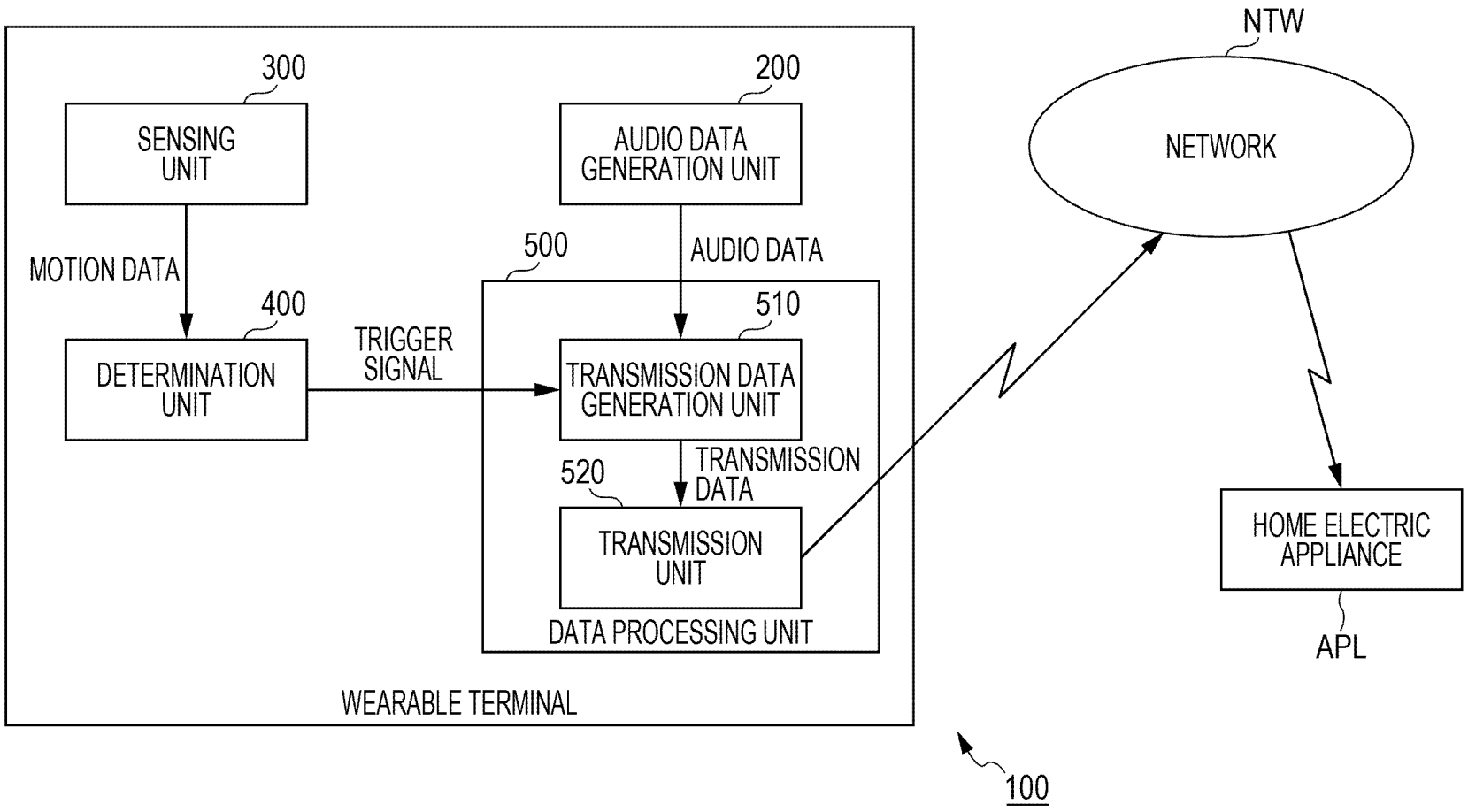
FIG. 1 is a schematic block diagram of a wearable terminal according to a first embodiment.

Findings on which the present disclosure is based

The inventors have found that the technique disclosed in Patent Literature 1 given above has the following difficulties.

In the technique disclosed in Patent Literature 1, when using a wearable terminal as a control device, a user has to give motions corresponding to the contents of control to the wearable terminal. To this end, the user has to learn and memorize various motions representing the contents of control.

In addition, the user may sometimes move the part of their body on which the wearable terminal is worn, for purposes other than the remote control of a home electric appliance. Accordingly, the technique disclosed in Patent Literature 1 is likely to cause the wearable terminal to fail to work properly.

To address the problems described above, the inventors have developed the following solution.

A first aspect of the present disclosure provides a wearable terminal configured to be wearable on an upper limb of a user and usable in a system for allowing remote control of a home electric appliance via a network by using voice instructions. The wearable terminal includes voice data generation unit a voice data generation unit configured to generate audio data from the voice instructions, a sensing unit configured to sense a motion of the upper limb in a first axis direction perpendicular to a plane defined by a vertically downward oriented direction of the upper limb and a direction of movement of the user, and to generate motion data concerning the motion, a determination unit configured to determine, based on the motion data, whether or not the user is going to perform remote control of the home electric appliance, and a data processing unit configured to process the audio data. The data processing unit includes (i) a transmission data generation unit configured to generate transmission data corresponding to the audio data in a case where the determination unit determines that the user is going to perform remote control of the home electric appliance, and (ii) a transmission unit configured to transmit the transmission data to the network.

According to this aspect, the sensing unit generates motion data concerning a motion of a user's upper limb in a first axis direction perpendicular to a plane defined by a vertically downward oriented direction of the upper limb and a direction of movement of the user. Thus, the determination unit may be able to accurately determine whether or not the user is going to perform remote control of a home electric appliance. When the determination unit determines, based on the motion data, that the user is going to perform remote control of the home electric appliance, the transmission data generation unit generates transmission data corresponding to audio data. Accordingly, the remote control of the home electric appliance may be achieved with accuracy and ease.

In the first aspect, the motion data may indicate an acceleration of the upper limb in the first axis direction. When the acceleration is larger than an acceleration threshold, the determination unit may determine that the user is going to perform remote control of the home electric appliance.

According to this aspect, when the acceleration is larger than an acceleration threshold, the determination unit determines that the user is going to perform remote control. Thus, the remote control of the home electric appliance may be achieved with accuracy and ease.

In the first aspect, the sensing unit may be configured to sense an angular velocity of a rotational motion of the upper limb about a second axis extending in the vertically downward oriented direction of the upper limb, and to generate angular velocity data indicating the angular velocity as the motion data. The determination unit may compare a rotation angle of the upper limb calculated from the angular velocity data with a rotation angle threshold, and determine that the user is going to perform remote control of the home electric appliance when the rotation angle is larger than the rotation angle threshold.

According to this aspect, the determination unit determines whether or not the user is going to perform remote control, by using not only acceleration but also using angular velocity. Thus, the remote control of the home electric appliance may be achieved with accuracy and ease.

In the first aspect, the wearable terminal may further include a power supply unit configured to supply power to the data processing unit. In a case where the determination unit determines that the user is going to perform remote control of the home electric appliance, the power supply unit may start supplying the power to the data processing unit.

According to this aspect, in a case where the determination unit determines that the user is going to perform remote control, the power supply unit starts supplying power to the data processing unit. Thus, the power consumption of the wearable terminal may be low.

A second aspect of the present disclosure provides a control method suitably used for a wearable terminal configured to be wearable on an upper limb of a user and usable in a system for allowing remote control of a home electric appliance via a network by using voice instructions. The control method includes a sensing step of sensing a motion of the upper limb in a first axis direction perpendicular to a plane defined by a vertically downward oriented direction of the upper limb and a direction of movement of the user, and generating motion data concerning the motion, a determination step of determining, based on the motion data, whether or not the user is going to perform remote control of the home electric appliance, a generation step of receiving the voice instructions and generating transmission data corresponding to the voice instructions in a case where it is determined in the determination step that the user is going to perform remote control of the home electric appliance, and a transmission step of transmitting the transmission data to the network.

According to this aspect, in the sensing step, motion data concerning a motion of a user's upper limb in a first axis direction perpendicular to a plane defined by a vertically downward oriented direction of the upper limb and a direction of movement of the user is generated. Thus, in the determination step, it is accurately determined whether or not the user is going to perform remote control of a home electric appliance. When it is determined in the determination step that the user is going to perform remote control of the home electric appliance, in the generation step, transmission data corresponding to voice instructions is generated. Thus, the remote control of the home electric appliance may be achieved with accuracy and ease.

In the second aspect, the sensing step may include sensing an acceleration of the upper limb in the first axis direction. The determination step may include comparing the acceleration with an acceleration threshold, and determining that the user is going to perform remote control of the home electric appliance when the acceleration is larger than the acceleration threshold.

According to this aspect, when the acceleration is larger than an acceleration threshold, in the determination step, it is determined that the user is going to perform remote control. Thus, the remote control of the home electric appliance may be achieved with accuracy and ease.

In the second aspect, the sensing step may include sensing an angular velocity of a rotational motion of the upper limb about a second axis extending in the vertically downward oriented direction of the upper limb. The determination step may include comparing a rotation angle of the upper limb calculated using the angular velocity with a rotation angle threshold, and determining that the user is going to perform remote control of the home electric appliance if the rotation angle is larger than the rotation angle threshold.

According to this aspect, in the determination step, it is determined whether or not the user is going to perform remote control, by using not only acceleration but also using angular velocity. Thus, the remote control of the home electric appliance may be achieved with accuracy and ease.

The above-described generic or specific aspects may be implemented by a system, a method, an integrated circuit, a computer program, or a computer-readable recording medium such as a compact disc read-only memory (CD-ROM), or may be implemented by any combination of a system, a method, an integrated circuit, a computer program, and a recording medium.

In the following, some embodiments regarding a technique for control of home electrical devices using a wearable terminal will be described with reference to the accompanying drawings. The technique for controlling home electrical devices using a wearable terminal will be apparently understood from the following description. Note that the direction associated with the terms "up", "down", "left", "right", etc. is for descriptive purposes only and is intended to be broadly construed.

First Embodiment

As described above, in existing control techniques using a wearable terminal, the content of the control to be performed on a home electric appliance is determined in accordance with a user gesture. This requires a user to learn and memorize multiple gestures to request a home electric appliance to perform various operations.

In some cases, a wearable terminal may be moved without user's intention to control a home electric appliance. The wearable terminal may reciprocate back and forth when worn on the upper limb of the user. If one of the gestures described above is a back-and-forth reciprocating movement of a wearable terminal, the associated home electric appliance may perform an operation that is not intended by the user.

The inventors have found the difficulties described above from the related art, and have developed a wearable terminal that may provide easy and accurate instruction to control a home electric appliance. In a first embodiment, a design concept of a wearable terminal developed by the inventors will be described.

FIG. 1 is a schematic block diagram of a wearable terminal 100 according to the first embodiment. The wearable terminal 100 will be described with reference to FIG. 1.

The wearable terminal 100 is worn on a user's upper limb. The term "upper limb", as used herein, refers to a body portion of a user extending from the shoulder to the fingertip. The wearable terminal 100 may be designed to be wearable on a user's wrist. Alternatively, the wearable terminal 100 may be designed to be wearable on a user's finger. The basic concept of this embodiment is not limited to a specific position at which the wearable terminal 100 is worn.

When the wearable terminal 100 is designed to be wearable on a user's wrist, the wearable terminal 100 may look like a watch. When the wearable terminal 100 is designed to be wearable on a user's finger, the wearable terminal 100 may look like a ring. The designer of the wearable terminal 100 may determine the design of the wearable terminal 100 so as to be suitable for the position at which the wearable terminal 100 is worn. Accordingly, the basic concept of this embodiment is not limited to a specific design of the wearable terminal 100.

The wearable terminal 100 is incorporated into a system that allows remote control of a home electric appliance APL. When a user attempts to take remote control of the home electric appliance APL, the user gives voice instructions to the wearable terminal 100. The wearable terminal 100 converts audio from the user into an electrical signal. The converted signal is transmitted from the wearable terminal 100 to a network NTW. The network NTW generates a control signal for controlling the home electric appliance APL in accordance with the converted signal. The control signal is transmitted from the network NTW to the home electric appliance APL. The home electric appliance APL executes a predetermined operation in accordance with the control signal. Alternatively, the home electric appliance APL stops its operation in accordance with the control signal.

The signal transmitted from the wearable terminal 100 to the network NTW may directly represent the audio of the user as it is. In this case, the network NTW may identify the audio of the user from a signal from the wearable terminal 100 and determine the content of the operation that the user has requested the home electric appliance APL to perform. As a result, the network NTW can generate a control signal indicating the content of the requested operation.

The wearable terminal 100 may extract a specific audio portion (e.g., an audio segment representing a specific word that is necessary for a control signal) from the audio of the user. In this case, a signal indicating the extracted audio segment may be transmitted from the wearable terminal 100 to the network NTW. As a result, the network NTW can determine the content of the operation that the user has requested the home electric appliance APL to perform, from the received signal, and generate a control signal indicating the content of the requested operation.

The wearable terminal 100 may have a function to identify the audio of the user. In this case, the wearable terminal 100 may be able to generate a signal indicating the content of the operation that the user has requested the home electric appliance APL to perform. The generated signal is transferred from the wearable terminal 100 to the home electric appliance APL via the network NTW.

As described above, the signal transmitted from the wearable terminal 100 to the network NTW may represent various kinds of content. Accordingly, the basic concept of this embodiment is not limited to a specific kind of content indicated by a signal transmitted from the wearable terminal 100 to the network NTW.

Various communication technologies that enable connection between the wearable terminal 100 and the home electric appliance APL so that the wearable terminal 100 and the home electric appliance APL can communicate with each other are applicable to the network NTW. For example, the network NTW may include a cloud server, a communication network over which the wearable terminal 100 is connected to the cloud server so that the wearable terminal 100 and the cloud server can communicate with each other, and a communication network over which the cloud server is connected to the home electric appliance APL so that the cloud server and the home electric appliance APL can communicate with each other. These communication paths may be based on various existing communication technologies. The basic concept of this embodiment is not limited to a specific communication technology that is applied to the network NTW.

The home electric appliance APL may be any of various devices which may be used in general homes. Examples of the home electric appliance APL include a television set, a washing machine, an air conditioner, and a cooker. The basic concept of this embodiment is not limited to a specific type of home electric appliance APL.

The wearable terminal 100 includes voice data generation unit a voice data generation unit 200, a sensing unit 300, a determination unit 400, and a data processing unit 500. The voice data generation unit 200 generates audio data from voice instructions given by a user. The sensing unit 300 senses a motion given to the wearable terminal 100 by the user, and generates motion data indicating the motion. The determination unit 400 determines, based on the motion data, whether or not the user is going to take remote control of the home electric appliance APL. The data processing unit 500 processes the audio data.

Various devices capable of converting audio into an electrical signal (i.e., the audio data described above) are applicable to the voice data generation unit 200. For example, a typical small microphone may be used as the voice data generation unit 200. The basic concept of this embodiment is not limited to a specific device used as the voice data generation unit 200.

Various sensor devices capable of sensing a motion given to the wearable terminal 100 and generating an electrical signal indicating the motion (i.e., the motion data described above) are applicable to the sensing unit 300. The sensing unit 300 may be a typical acceleration sensor. Alternatively, the sensing unit 300 may be a typical angular velocity sensor. Alternatively, furthermore, the sensing unit 300 may be a sensor device (e.g., a typical six-axis sensor) capable of detecting acceleration and angular velocity. The basic concept of this embodiment is not limited to a specific sensor device used as the sensing unit 300.

The determination unit 400 may be an electronic component and/or a program for performing a determination process based on motion data. When the sensing unit 300 is designed to detect the acceleration of the wearable terminal 100, the determination unit 400 may determine whether or not the acceleration is larger than an acceleration threshold (a threshold predetermined for acceleration). If the acceleration is larger than the acceleration threshold, the determination unit 400 may determine that the user is going to take remote control of the home electric appliance APL. When the sensing unit 300 is designed to detect the angular velocity of the wearable terminal 100, the determination unit 400 may apply an integration operation process to motion data indicating the angular velocity. As a result, the determination unit 400 can obtain data concerning the rotation angle of the wearable terminal 100. The determination unit 400 may compare the calculated rotation angle with a rotation angle threshold (a threshold predetermined for rotation angle). If the rotation angle is larger than the rotation angle threshold, the determination unit 400 may determine that the user is going to take remote control of the home electric appliance APL. As described above, the determination unit 400 may perform various determination processes. Accordingly, the basic concept of this embodiment is not limited to a specific determination process of the determination unit 400.

If the determination unit 400 determines that the user is going to take remote control of the home electric appliance APL, the determination unit 400 generates a trigger signal. The trigger signal is output from the determination unit 400 to the data processing unit 500. The data processing unit 500 starts the processing of audio data in accordance with the trigger signal.

The sensing unit 300 and the determination unit 400 may be formed as an integrated circuit. In this case, the data processing unit 500 may be formed as another integrated circuit.

The sensing unit 300, the determination unit 400, and the data processing unit 500 may be formed as a single integrated circuit. Alternatively, the sensing unit 300, the determination unit 400, and the data processing unit 500 may be formed as separate circuits. The basic concept of this embodiment is not limited to a specific circuit structure of the sensing unit 300, the determination unit 400, and the data processing unit 500.

The data processing unit 500 includes a transmission data generation unit 510 and a transmission unit 520. The audio data described above is output from the voice data generation unit 200 to the transmission data generation unit 510. The trigger signal described above is output from the determination unit 400 to the transmission data generation unit 510. The transmission data generation unit 510 starts the processing of the audio data in accordance with the trigger signal, and generates transmission data corresponding to the audio data. The transmission data is output from the transmission data generation unit 510 to the transmission unit 520. The transmission unit 520 transmits the transmission data to the network NTW.

Figure 2:
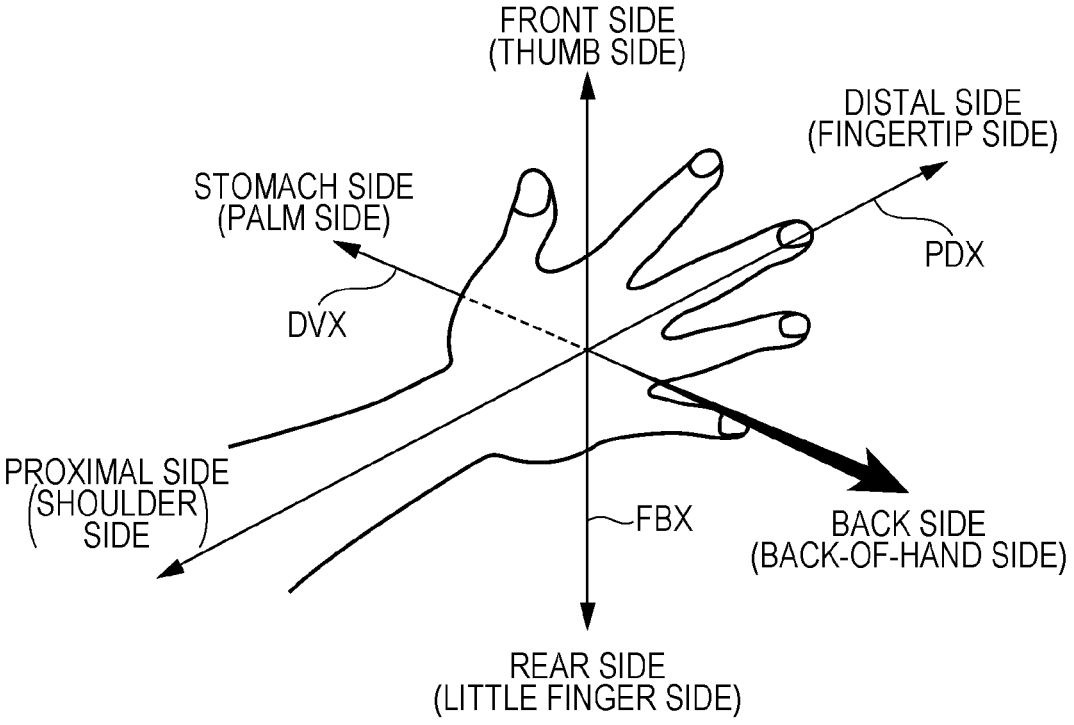
FIG. 2 is a conceptual diagram of a three-dimensional coordinate system that is set for a user's upper limb.

FIG. 2 is a conceptual diagram of a three-dimensional coordinate system that is set for the upper limb. A motion detection technique of the sensing unit 300 will be described with reference to FIG. 1 and FIG. 2.

The sensing unit 300 detects a motion of the upper limb in the direction of a first axis DVX. A coordinate axis extending along the extended upper limb, from the shoulder to the fingertip, in the vertically downward oriented direction of the upper limb is hereinafter referred to as a second axis PDX. A coordinate axis perpendicular to the second axis PDX and extending in the direction of movement of the user is hereinafter referred to as a third axis FBX. The first axis DVX is perpendicular to a coordinate plane defined by the second axis PDX and the third axis FBX.

The sensing unit 300 detects a movement of the upper limb in the extending direction of the first axis DVX perpendicular to the coordinate plane defined by the second axis PDX and the third axis FBX. A detection axis of a sensor used as the sensing unit 300 may be perpendicular to the coordinate plane defined by the second axis PDX and the third axis FBX. In this case, the sensing unit 300 may be able to accurately sense a motion (e.g., acceleration and/or angular velocity) in the direction extending along the first axis DVX. Alternatively, a detection axis of a sensor used as the sensing unit 300 may be inclined at an angle larger than 0° and smaller than 90° with respect to the coordinate plane defined by the second axis PDX and the third axis FBX. In this case, the sensing unit 300 can sense not only a motion in the direction extending along the first axis DVX but also a motion in a direction extending along the coordinate plane defined by the second axis PDX and the third axis FBX. The determination unit 400 may apply a predetermined vector operation to the motion data output from the sensing unit 300, and individually evaluate the motion in the direction extending along the first axis DVX and the motion in the direction extending along the coordinate plane defined by the second axis PDX and the third axis FBX. The basic concept of this embodiment is not limited to a specific angle at which a detection axis of a sensor intersects the coordinate plane defined by the second axis PDX and the third axis FBX. In this embodiment, a plane may be exemplified by the coordinate plane defined by the second axis PDX and the third axis FBX. The intersection direction may be exemplified by the direction of a detection axis of a sensor used as the sensing unit 300.

While the user is walking, the upper limbs frequently move in the direction indicated by the third axis FBX. When the user attempts to pick up an object far in front of them, the upper limb is extended, causing the wearable terminal 100 to be likely to move in the direction indicated by the second axis PDX. When the user attempts to pick up an object in front of their chest, the upper limb bends, causing the wearable terminal 100 to be likely to be move in the direction indicated by the second axis PDX. The user's motions described above frequently occur. By comparison with motions in the directions indicated by the third axis FBX and the second axis PDX, the motion of the upper limb in the direction indicated by the first axis DVX does not frequently occur. That is, the user does not usually move the upper limb quickly and/or a large amount in the direction indicated by the first axis DVX.

When the sensing unit 300 senses a motion of the upper limb (i.e., the wearable terminal 100) in the direction indicated by the first axis DVX, the data processing unit 500 starts the processing of audio data. Thus, the processing of audio data is not likely to start in response to an accidental or unintentional movement of the user. Accordingly, the home electric appliance APL may not be likely to be operated without intention.

Second Embodiment

The wearable terminal described in connection with the first embodiment may operate under various forms of control. In a second embodiment, an illustrative operation of the wearable terminal will be described.

Figure 3:
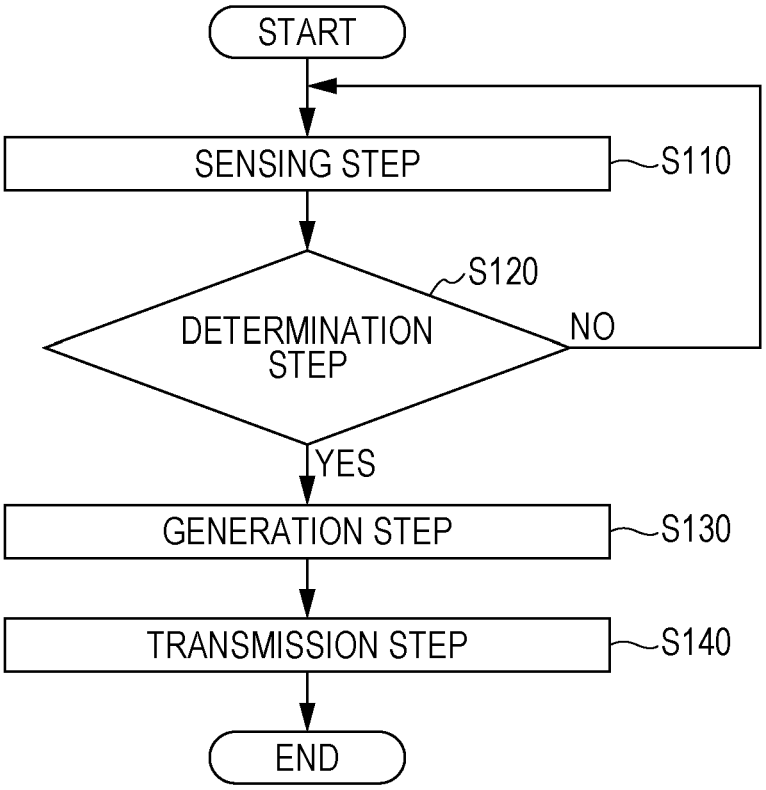
FIG. 3 is a schematic flowchart of illustrative data processing of the wearable terminal illustrated in FIG. 1 (second embodiment)

FIG. 3 is a schematic flowchart of illustrative data processing of the wearable terminal 100. Data processing in the wearable terminal 100 will be described with reference to FIG. 1 to FIG. 3.

Step S110

In step S110, a sensing step is executed. In the sensing step, the sensing unit 300 senses a motion in the extending direction of the first axis DVX perpendicular to the coordinate plane defined by the second axis PDX and the third axis FBX. The sensing unit 300 generates motion data indicating the motion in the extending direction of the first axis DVX. The motion data is output from the sensing unit 300 to the determination unit 400. After that, step S120 is executed.

Step S120

In step S120, a determination step is executed. In the determination step, the determination unit 400 determines, based on the motion data, whether or not the user is going to perform remote control of the home electric appliance APL. If the determination unit 400 determines that the user is going to perform remote control of the home electric appliance APL, step S130 is executed. Otherwise, step S110 is executed.

Step S130

In step S130, a generation step is executed. In the generation step, the voice data generation unit 200 generates audio data indicating voice instructions from a user. The audio data is output from the voice data generation unit 200 to the transmission data generation unit 510. The determination unit 400 generates a trigger signal. The trigger signal is output from the determination unit 400 to the transmission data generation unit 510. When the transmission data generation unit 510 receives the trigger signal, the transmission data generation unit 510 generates transmission data from the audio data. After that, step S140 is executed.

Step S140

In step S140, a transmission step is executed. In the transmission step, the transmission data is output from the transmission data generation unit 510 to the transmission unit 520. The transmission unit 520 transmits the transmission data to the network NTW.

Third Embodiment

In a design concept of the wearable terminal described in connection with the first embodiment, an acceleration sensor or angular velocity sensor having one detection axis may be used as a sensing unit. In this case, the sensing unit has low power consumption. However, a sensor element (the acceleration sensor or angular velocity sensor) having multiple detection axes will not have an excessively high power consumption. Accordingly, a sensor element having a plurality of detection axes may be used for the detection of a motion of the upper limb of the user. In this case, a determination unit may be able to accurately determine how the upper limb of the user is moving, using the motion data output from the sensing unit. In a third embodiment, a wearable terminal configured to be able to accurately determine whether or not the user has requested remote control of a home electric appliance will be described.

Figure 4:
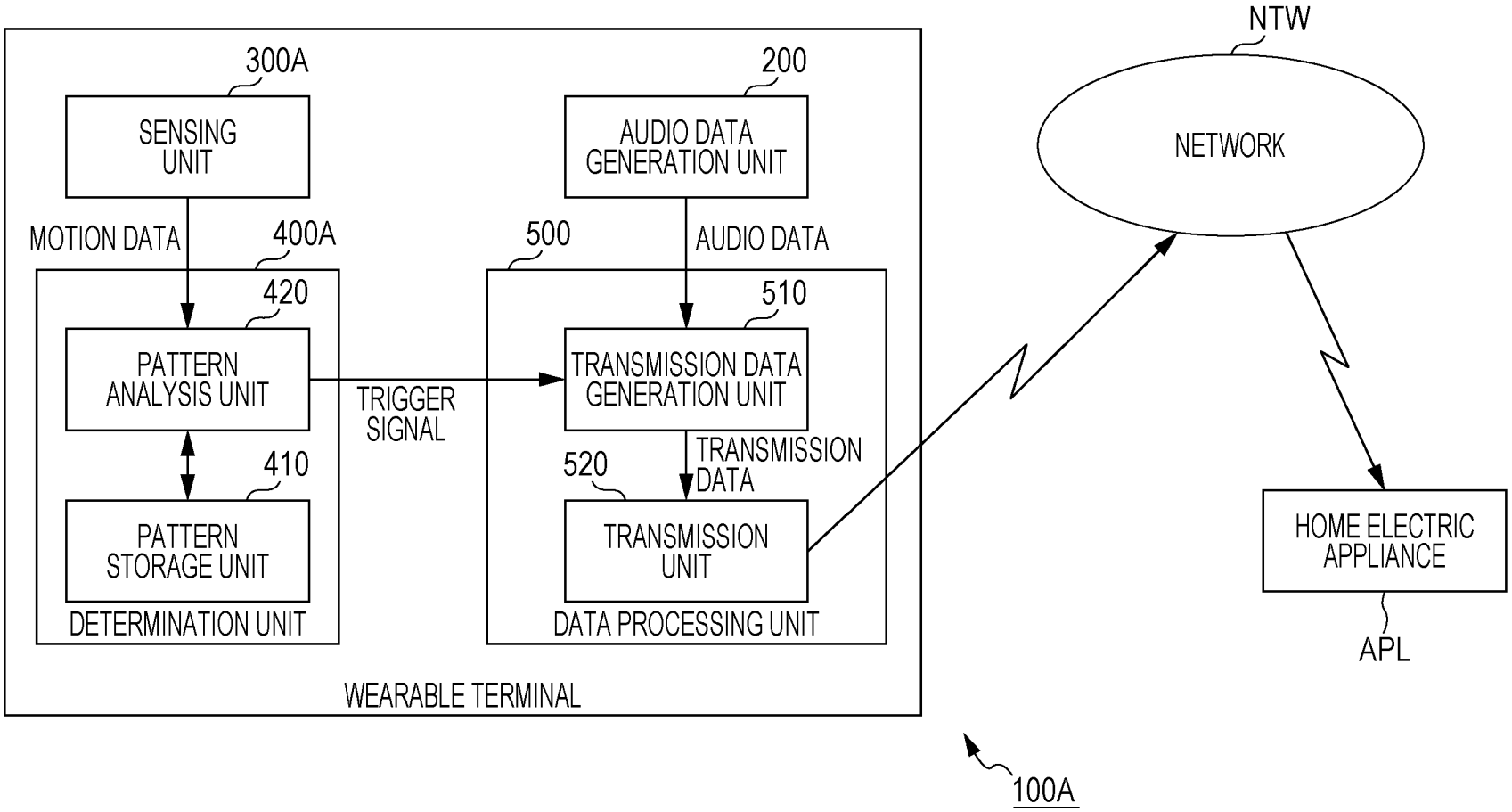
FIG. 4 is a schematic block diagram of a wearable terminal according to a third embodiment.

FIG. 4 is a schematic block diagram of a wearable terminal 100A according to the third embodiment. The wearable terminal 100A will be described with reference to FIG. 2 and FIG. 4. Numerals common to the first embodiment and third embodiment designate components having substantially the same features. Thus, these components are identified using the description made in the first embodiment.

Similarly to the first embodiment, the wearable terminal 100A is worn on the upper limb of the user. The wearable terminal 100A is incorporated into a system that allows remote control of the home electric appliance APL. When the user attempts to take remote control of the home electric appliance APL, the user gives voice instructions to the wearable terminal 100A. The wearable terminal 100A converts audio from the user into an electrical signal. The converted signal is transmitted from the wearable terminal 100A to the network NTW. The network NTW generates a control signal for controlling the home electric appliance APL in accordance with the converted signal. The control signal is transmitted from the network NTW to the home electric appliance APL. The home electric appliance APL executes a predetermined operation in accordance with the control signal. Alternatively, the home electric appliance APL stops its operation in accordance with the control signal.

Similarly to the first embodiment, the wearable terminal 100A includes voice data generation unit a voice data generation unit 200 and a data processing unit 500. These components are identified using the description made in the first embodiment.

The wearable terminal 100A further includes a sensing unit 300A and a determination unit 400A. The sensing unit 300A generates motion data indicating a motion of the upper limb. The motion data is output from the sensing unit 300A to the determination unit 400A. The determination unit 400A determines, based on the motion data, whether or not the user has requested remote control of a home electric appliance. If the determination unit 400A determines that the user has requested remote control of a home electric appliance, the determination unit 400A generates a trigger signal. The trigger signal is output from the determination unit 400A to the transmission data generation unit 510.

The sensing unit 300A may be a sensor element having six detection axes. Three of the six detection axes may be used for the detection of acceleration. The remaining detection axes may be used for the detection of angular velocity. At least one of the six detection axes is used for the sensing of a motion in a direction that intersects the coordinate plane defined by the second axis PDX and the third axis FBX. Accordingly, as described in connection with the first embodiment, the determination unit 400A may be able to accurately determine whether or not the user has requested remote control of a home electric appliance.

The sensing unit 300A may be a sensor element having two to five detection axes. Alternatively, the sensing unit 300A may be a sensor element having more than six detection axes. The basic concept of this embodiment is not limited to a specific number of detection axes.

The determination unit 400A includes a pattern storage unit 410 and a pattern analysis unit 420. The pattern storage unit 410 stores in advance pattern data concerning motions of the upper limb before the user makes voice instructions. The pattern data may be a pattern of variations in acceleration. Alternatively, the pattern data may be a pattern of variations in angular velocity. The motion data is output from the sensing unit 300A to the pattern analysis unit 420.

After the motion data is output from the sensing unit 300A to the pattern analysis unit 420, the pattern analysis unit 420 reads pattern data from the pattern storage unit 410. The pattern analysis unit 420 compares the motion data with the pattern data.

If the motion data is similar or identical to the pattern data, the pattern analysis unit 420 may determine that the user has requested remote control of the home electric appliance APL. In this case, the pattern analysis unit 420 generates a trigger signal. The trigger signal is output from the pattern analysis unit 420 to the transmission data generation unit 510.

If the motion data is far different from the pattern data, the pattern analysis unit 420 may determine that the user has not requested remote control of the home electric appliance APL. In this case, no trigger signal is output from the pattern analysis unit 420 to the transmission data generation unit 510. Thus, erroneous remote control of the home electric appliance APL may be prevented or at least reduced.

Fourth Embodiment

Setting a reference action for a motion of the upper limb may facilitate comparison between motion data and pattern data. A trigger signal is generated if a motion of the upper limb which is subsequent to the reference action is similar or identical to the motion indicated by the pattern data, resulting in a reduction in the amount of pattern data to be stored in a pattern storage unit. In a fourth embodiment, illustrative data processing in a wearable terminal will be described.

Figure 5:
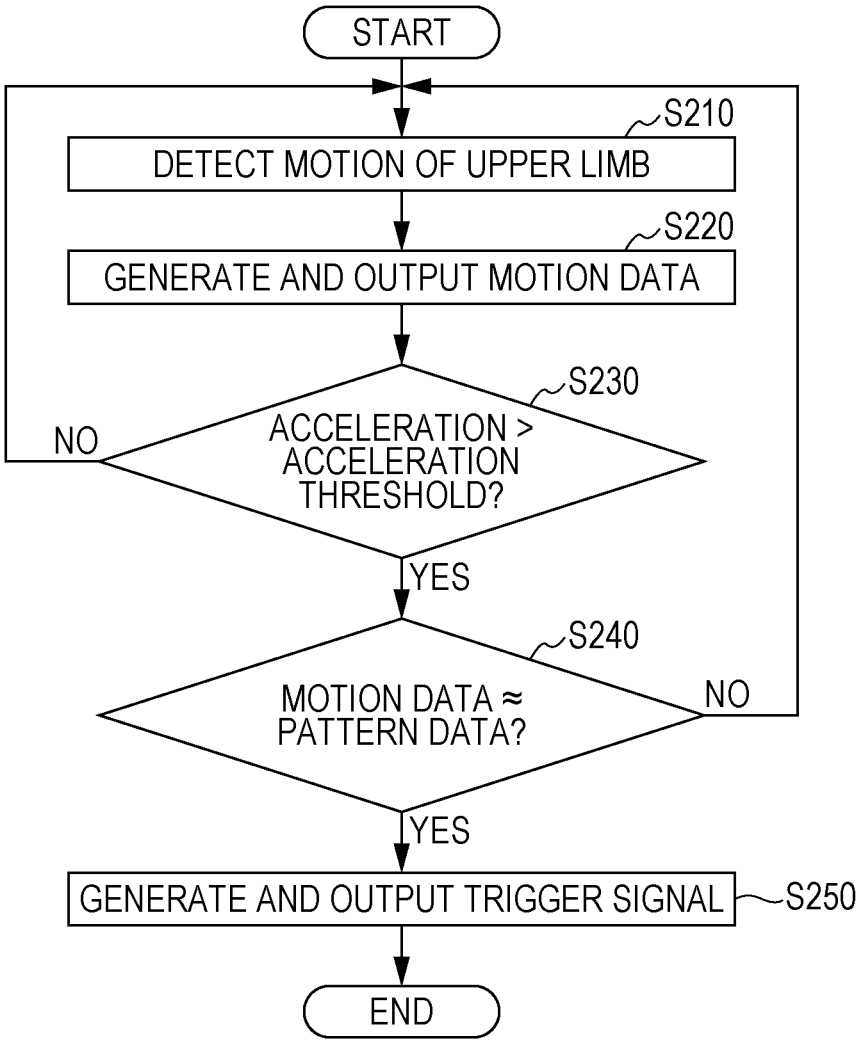
FIG. 5 is a schematic flowchart of illustrative data processing of the wearable terminal illustrated in FIG. 4 (fourth embodiment)

FIG. 5 is a schematic flowchart of illustrative data processing of the wearable terminal 100A. Data processing in the wearable terminal 100A will be described with reference to FIG. 2 to FIG. 5. Numerals common to the third embodiment and the fourth embodiment designate components having substantially the same features. Thus, these components are identified using the description made in the third embodiment.

As described in connection with the third embodiment, the sensing unit 300A has a plurality of detection axes. One of the plurality of detection axes is used for the sensing of an acceleration in the extending direction of the first axis DVX perpendicular to the coordinate plane defined by the second axis PDX and the third axis FBX. Thus, part of the motion data output from the sensing unit 300A can represent an acceleration in the extending direction of the first axis DVX. The other detection axes may be used for the sensing of acceleration and/or angular velocity in other directions.

Step S210

In step S210, the sensing unit 300A senses a motion of the upper limb. After that, step S220 is executed.

Step S220

In step S220, the sensing unit 300A generates motion data indicating the motion of the upper limb. The motion data is output from the sensing unit 300A to the pattern analysis unit 420. After that, step S230 is executed. Step S210 and step S220 correspond to the sensing step described with reference to FIG. 3.

Step S230

In step S230, the pattern analysis unit 420 determines whether or not the acceleration in the extending direction of the first axis DVX is larger than an acceleration threshold. If the acceleration in the extending direction of the first axis DVX is larger than the acceleration threshold, step S240 is executed. Otherwise, step S210 is executed.

Step S240

In step S240, the pattern analysis unit 420 reads pattern data from the pattern storage unit 410. The pattern analysis unit 420 compares motion data, which is obtained at a point in time after the time at which an acceleration larger than the acceleration threshold occurred, with the pattern data. If the motion data is similar or identical to the pattern data, step S250 is executed. Otherwise, step S210 is executed.

Step S250

In step S250, the pattern analysis unit 420 generates a trigger signal. The trigger signal is output from the pattern analysis unit 420 to the transmission data generation unit 510. Step S230 to step S250 correspond to the determination step described with reference to FIG. 3.

The user who is going to take remote control of the home electric appliance APL may abruptly move the upper limb in the extending direction of the first axis DVX. As a result, the processes of step S230 and step S240 are executed.

The pattern data may indicate a motion of the upper limb which includes a movement of the upper limb in the extending direction of the first axis DVX and a movement of the upper limb toward the mouth of the user. When the user brings the wearable terminal 100A near their mouth after having abruptly moved the upper limb in the extending direction of the first axis DVX step S250 is executed.

Fifth Embodiment

In a case where a sensing unit is configured to output motion data indicating acceleration and motion data indicating angular velocity, a determination unit may accurately determine whether or not the user has requested remote control of a home electric appliance. In a fifth embodiment, a wearable terminal configured to determine, using motion data indicating acceleration and motion data indicating angular velocity, whether or not the user has requested remote control of a home electric appliance will be described.

Figure 6:
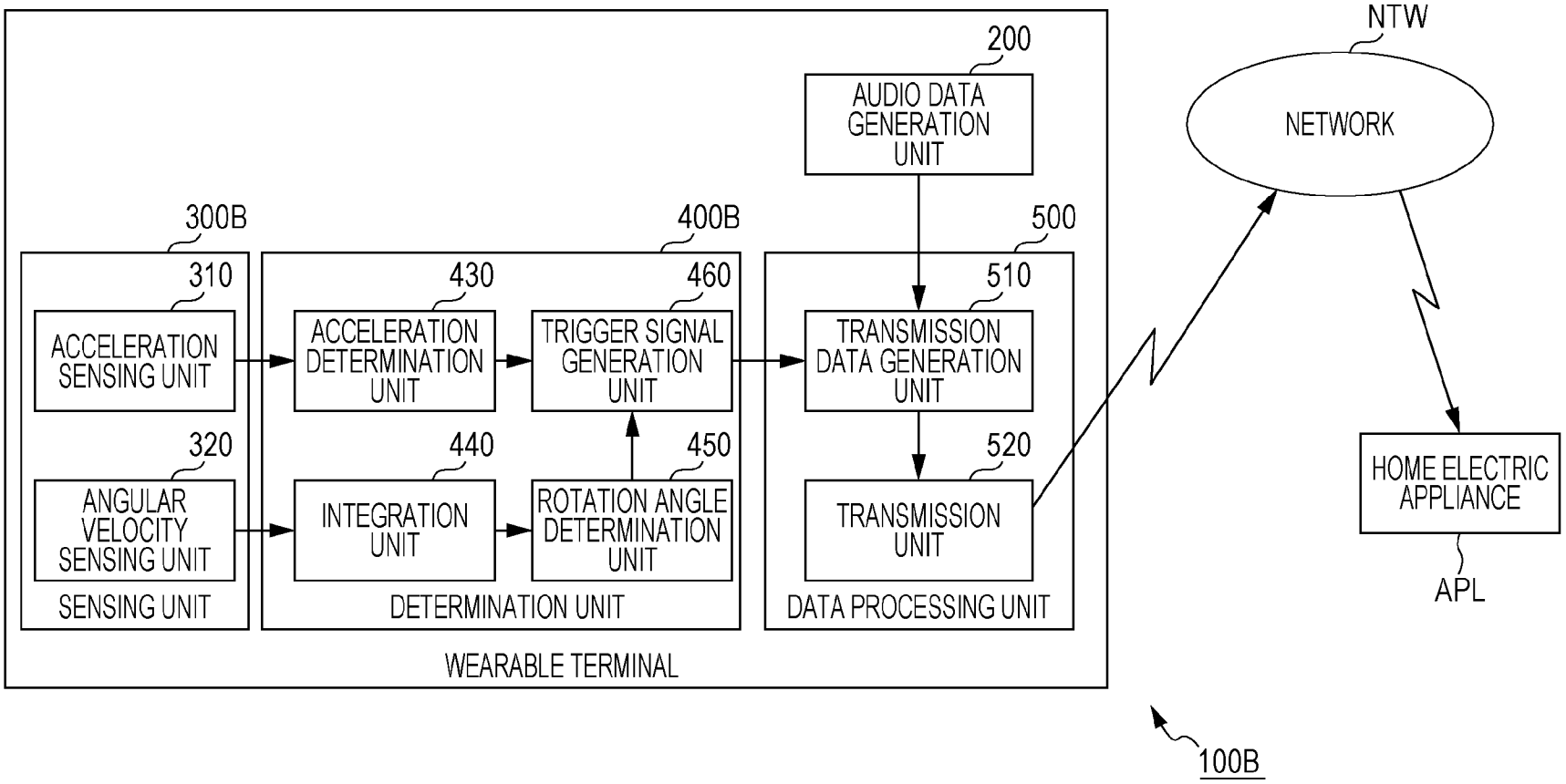
FIG. 6 is a schematic block diagram of a wearable terminal according to a fifth embodiment.

FIG. 6 is a schematic block diagram of a wearable terminal 100B according to the fifth embodiment. The wearable terminal 100B will be described with reference to FIG. 2 and FIG. 6. Numerals common to the third embodiment and the fifth embodiment designate components having substantially the same features. Thus, these components are identified using the description made in the third embodiment.

Similarly to the third embodiment, the wearable terminal 100B is worn on the upper limb of the user. The wearable terminal 100B is incorporated into a system that allows remote control of the home electric appliance APL. When the user attempts to take remote control of the home electric appliance APL, the user gives voice instructions to the wearable terminal 100B. The wearable terminal 100B converts audio from the user into an electrical signal. The converted signal is transmitted from the wearable terminal 100B to the network NTW. The network NTW generates a control signal for controlling the home electric appliance APL in accordance with the converted signal. The control signal is transmitted from the network NTW to the home electric appliance APL. The home electric appliance APL executes a predetermined operation in accordance with the control signal. Alternatively, the home electric appliance APL stops its operation in accordance with the control signal.

Similarly to the third embodiment, the wearable terminal 100B includes voice data generation unit a voice data generation unit 200 and a data processing unit 500. These components are identified using the description made in the third embodiment.

The wearable terminal 100B further includes a sensing unit 300B and a determination unit 400B. The sensing unit 300B includes an acceleration sensing unit 310 and an angular velocity sensing unit 320. The determination unit 400B includes an acceleration determination unit 430, an integration unit 440, a rotation angle determination unit 450, and a trigger signal generation unit 460.

The acceleration sensing unit 310 has a detection axis for sensing an acceleration in the extending direction of the first axis DVX. Additionally, the acceleration sensing unit 310 may have a detection axis for sensing an acceleration in another direction.

The acceleration sensing unit 310 generates, as motion data, acceleration data indicating an acceleration in the extending direction of the first axis DVX. The acceleration data is output from the acceleration sensing unit 310 to the acceleration determination unit 430. The acceleration determination unit 430 determines whether or not the acceleration indicated by the acceleration data is larger than a predetermined acceleration threshold. If the acceleration indicated by the acceleration data is larger than the predetermined acceleration threshold, the acceleration sensing unit 310 generates a first trigger signal. The first trigger signal is output from the acceleration determination unit 430 to the trigger signal generation unit 460.

The angular velocity sensing unit 320 has a detection axis for sensing the angular velocity of a rotational motion of the upper limb about the second axis PDX. Additionally, the angular velocity sensing unit 320 may have a detection axis for sensing angular velocity in another direction.

The angular velocity sensing unit 320 generates, as motion data, angular velocity data indicating the angular velocity of a rotational motion of the upper limb about the second axis PDX. The angular velocity data is output from the angular velocity sensing unit 320 to the integration unit 440. The integration unit 440 applies an integration process to the angular velocity data, and generates rotation angle data indicating the rotation angle of the upper limb about the second axis PDX. The rotation angle data is output from the integration unit 440 to the rotation angle determination unit 450. If the rotation angle indicated by the rotation angle data is larger than a predetermined rotation angle threshold, the rotation angle determination unit 450 generates a second trigger signal. The second trigger signal is output from the rotation angle determination unit 450 to the trigger signal generation unit 460.

Upon receipt of the first trigger signal and the second trigger signal, the trigger signal generation unit 460 generates a trigger signal. The trigger signal is output from the trigger signal generation unit 460 to the transmission data generation unit 510.

The designer of the wearable terminal 100B may use a microphone as the voice data generation unit 200. When the designer designs the wearable terminal 100B so that the wearable terminal 100B may be wearable on the wrist, the designer may arrange a sound collection unit of the microphone at a position corresponding to the face (or dial) of a watch (i.e., a position near the back of the hand). When the designer designs the wearable terminal 100B so that the wearable terminal 100B may be wearable on the finger, the designer may arrange a sound collection unit of the microphone at a position corresponding to a precious stone on a ring (i.e., a position near the back of the hand). In the design of the arrangements described above, the user brings the sound collection unit of the microphone near their mouth by usually abruptly lifting up the upper limb in the extending direction of the first axis DVX and then rotating the upper limb about the second axis PDX. If the user does not bring the sound collection unit of the microphone near their mouth, it is rare that the rotational motion of the upper limb about the second axis PDX occurs. Thus, the wearable terminal 100B may be less likely to cause erroneous remote control of the home electric appliance APL.

Sixth Embodiment

Setting a plurality of reference actions for a motion of the upper limb may allow the determination unit to accurately determine whether or not the user is going to take remote control of a home electric appliance. In a sixth embodiment, illustrative data processing in a wearable terminal configured to determine, using a plurality of reference actions, whether or not the user is going to take remote control of a home electric appliance will be described.

Figure 7:
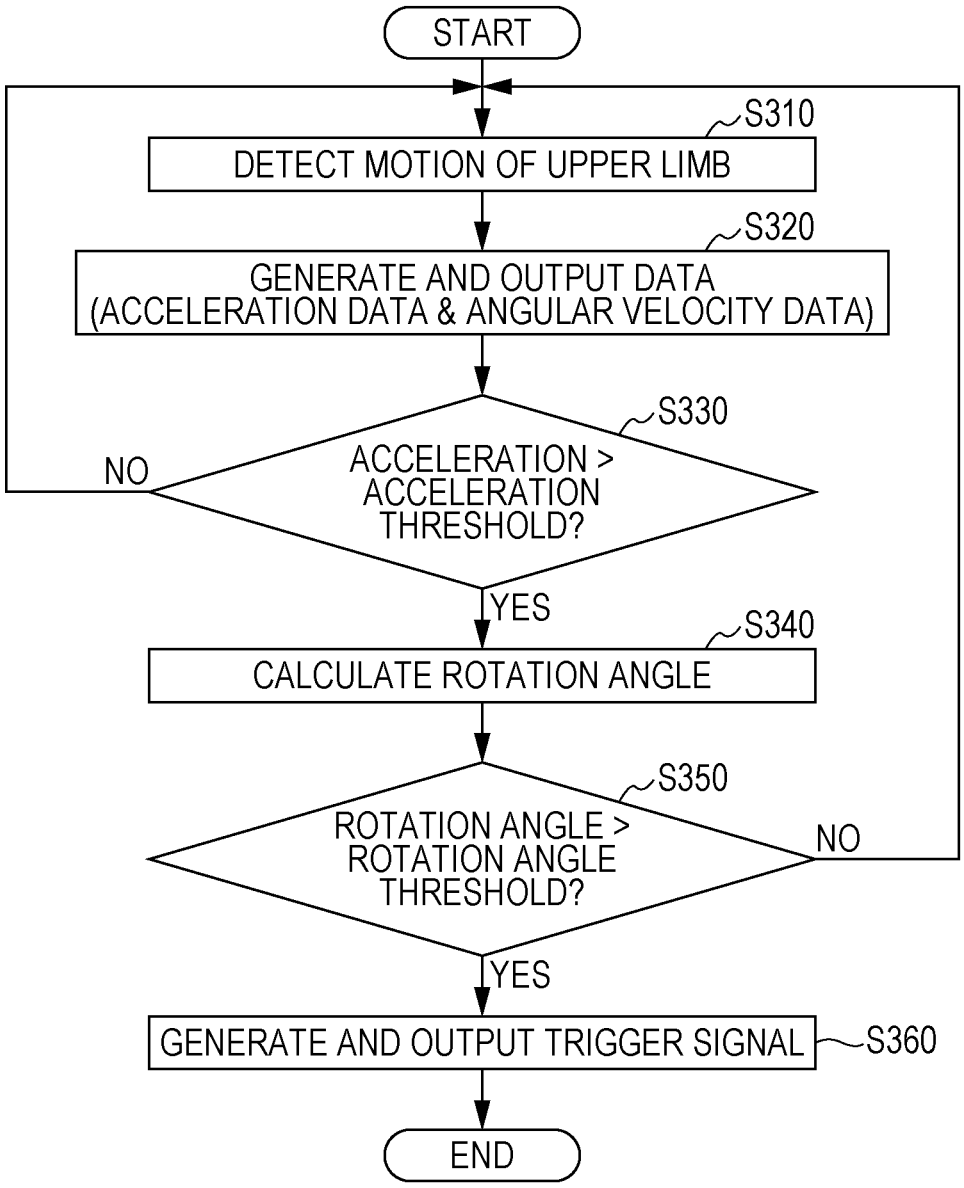
FIG. 7 is a schematic flowchart of illustrative data processing of the wearable terminal illustrated in FIG. 6 (sixth embodiment)

FIG. 7 is a schematic flowchart of illustrative data processing of the wearable terminal 100B. Data processing in the wearable terminal 100B will be described with reference to FIG. 2, FIG. 3, FIG. 6, and FIG. 7. Numerals common to the fifth embodiment and sixth embodiment designate components having substantially the same features. Thus, these components are identified using the description made in the fifth embodiment.

Step S310

In step S310, the sensing unit 300B senses a motion of the upper limb. The acceleration sensing unit 310 senses an acceleration in the extending direction of the first axis DVX. The angular velocity sensing unit 320 senses the angular velocity of a rotational motion of the upper limb about the second axis PDX. After that, step S320 is executed.

Step S320

In step S320, the sensing unit 300B generates motion data indicating the motion of the upper limb. The acceleration sensing unit 310 generates, as motion data, acceleration data indicating the acceleration in the extending direction of the first axis DVX. The acceleration data is output from the acceleration sensing unit 310 to the acceleration determination unit 430. The angular velocity sensing unit 320 generates, as motion data, angular velocity data indicating the angular velocity of the rotational motion of the upper limb about the second axis PDX. The angular velocity data is output from the angular velocity sensing unit 320 to the integration unit 440. After that, step S330 is executed. Step S310 and step S320 correspond to the sensing step described with reference to FIG. 3.

Step S330

In step S330, the acceleration determination unit 430 determines whether or not the acceleration indicated by the acceleration data is larger than an acceleration threshold. If the acceleration is larger than the acceleration threshold, the acceleration determination unit 430 generates a first trigger signal. The first trigger signal is output from the acceleration determination unit 430 to the trigger signal generation unit 460. After that, step S340 is executed. If the acceleration is not larger than the acceleration threshold, step S310 is executed.

Step S340

In step S340, the integration unit 440 performs an integration operation process on the angular velocity data, and calculates a rotation angle. Rotation angle data indicating the calculated rotation angle is output to the rotation angle determination unit 450. After that, step S350 is executed.

Step S350

In step S350, the rotation angle determination unit 450 determines whether or not the rotation angle indicated by the rotation angle data is larger than a rotation angle threshold. If the rotation angle is larger than the rotation angle threshold, the rotation angle determination unit 450 generates a second trigger signal. The second trigger signal is output from the rotation angle determination unit 450 to the trigger signal generation unit 460. After that, step S360 is executed. If the rotation angle is not larger than the rotation angle threshold, step S310 is executed. The processes of step S330 to step S350 correspond to the determination step described with reference to FIG. 3.

Step S360

In step S360, the trigger signal generation unit 460 generates a trigger signal. The trigger signal is output from the trigger signal generation unit 460 to the transmission data generation unit 510.

The user who is going to take remote control of the home electric appliance APL first abruptly moves the upper limb in the extending direction of the first axis DVX. Consequently, the processes of step S310 to step S330 are sequentially executed.

The user then rotates the upper limb about the second axis PDX. Consequently, the processes of step S340 to step S360 are sequentially executed.

It is unusual that a quick motion of the upper limb in the extending direction of the first axis DVX and a rotational motion of the upper limb about the second axis PDX occur by chance in combination. Thus, the wearable terminal 100B may be less likely to cause erroneous remote control of the home electric appliance APL.

Seventh Embodiment

In general, sensor elements have low power consumption. In contrast, the transmission of data to a network requires high power consumption. Thus, constant supply of power to an electronic component that is responsible for data transmission to a network is not desirable for wearable terminals. In a seventh embodiment, a design concept of a wearable terminal that requires low power consumption will be described.

Figure 8:
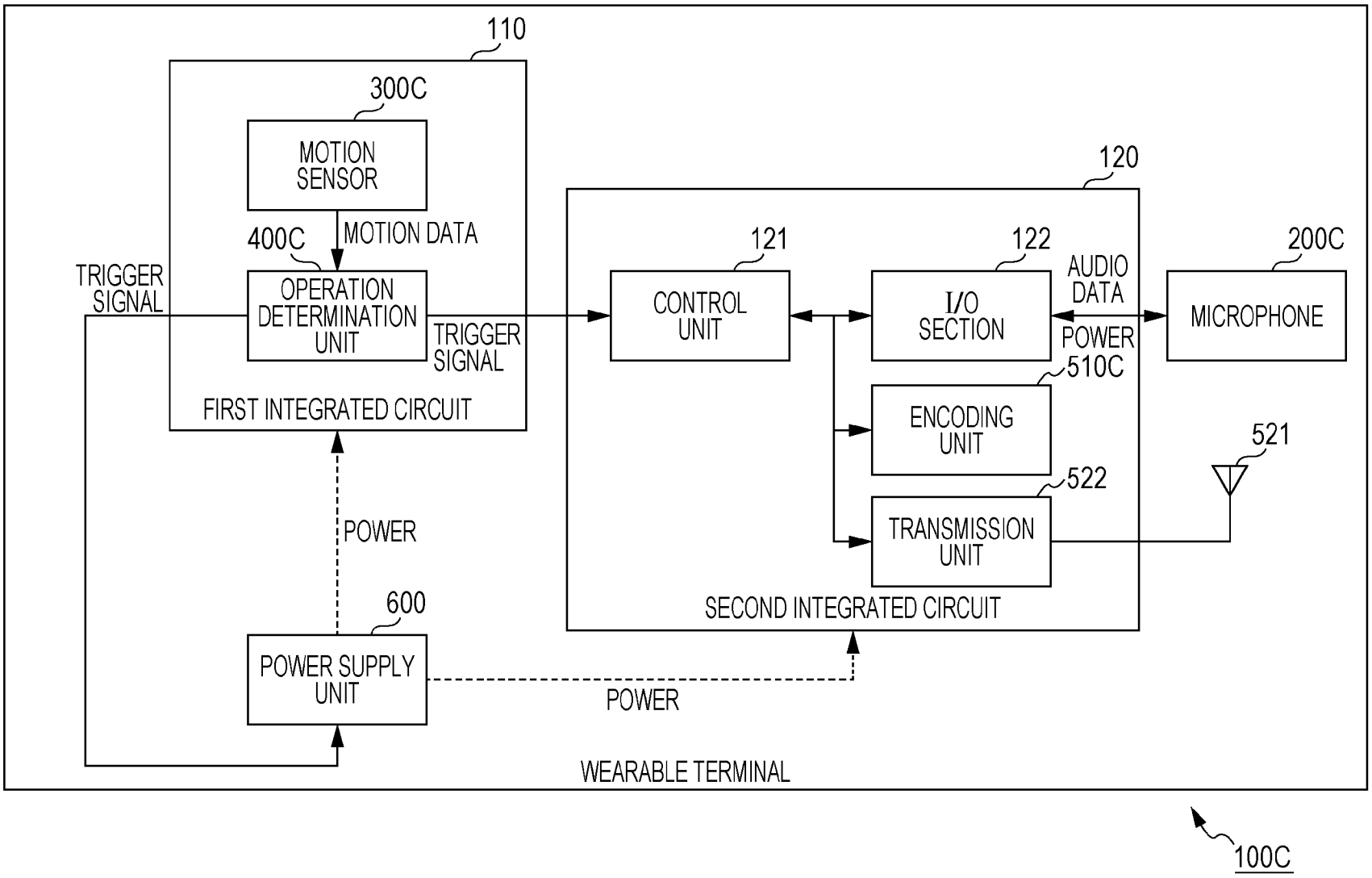
FIG. 8 is a schematic block diagram of a wearable terminal according to a seventh embodiment.

FIG. 8 is a schematic block diagram of a wearable terminal 100C according to the seventh embodiment. The wearable terminal 100C will be described with reference to FIG. 1, FIG. 4, FIG. 6, and FIG. 8.

The wearable terminal 100C includes a first integrated circuit 110, a second integrated circuit 120, a microphone 200C, an antenna unit 521, and a power supply unit 600. The microphone 200C converts audio from the user into an electrical signal (audio data). Accordingly, the microphone 200C corresponds to the voice data generation unit 200 described with reference to FIG. 1, FIG. 4, or FIG. 6. The antenna unit 521 is used to transmit transmission data to a network (not illustrated). Accordingly, the antenna unit 521 corresponds to part of the transmission unit 520 described with reference to FIG. 1, FIG. 4, or FIG. 6.

The first integrated circuit 110 includes a motion sensor 300C and an operation determination unit 400C. The motion sensor 300C is configured to sense a motion of the upper limb on which the wearable terminal 100C is worn. Accordingly, the motion sensor 300C may correspond to one of the sensing units 300, 300A, and 300B described with reference to FIG. 1, FIG. 4, and FIG. 6. Similarly to the sensing units 300, 300A, and 300B, the motion sensor 300C generates motion data indicating a motion of the upper limb. The motion data is output from the motion sensor 300C to the operation determination unit 400C.

The operation determination unit 400C analyzes the motion data, and determines whether or not the user is going to take remote control of a home electric appliance (not illustrated). Accordingly, the operation determination unit 400C may correspond to one of the determination units 400, 400A, and 400B described with reference to FIG. 1, FIG. 4, and FIG. 6. The operation determination unit 400C may have a function to, in addition to the function of the determination units 400, 400A, and 400B described with reference to FIG. 1, FIG. 4, and FIG. 6, learn a motion of the upper limb that the user performs when taking remote control of a home electric appliance. Similarly to the determination units 400, 400A, and 400B, when determining that the user is going to take remote control of a home electric appliance, the operation determination unit 400C generates a trigger signal. The trigger signal is output from the operation determination unit 400C to the second integrated circuit 120 and the power supply unit 600.

The power supply unit 600 may constantly supply power to the first integrated circuit 110 that is responsible for the sensing and analysis of a motion of the upper limb. On the other hand, the power supply unit 600 does not supply power to the second integrated circuit 120, which is responsible for communication with a network, when the power supply unit 600 does not receive the trigger signal. When the power supply unit 600 receives the trigger signal, the power supply unit 600 starts supplying power to the second integrated circuit 120. Thus, unnecessary power consumption may be prevented or at least reduced.

When the second integrated circuit 120 receives the trigger signal from the operation determination unit 400C and the second integrated circuit 120 receives power supply from the power supply unit 600, the second integrated circuit 120 executes data processing to convert the audio data received from the microphone 200C into transmission data. Accordingly, the second integrated circuit 120 corresponds to the data processing unit 500 described with reference to FIG. 1, FIG. 4, or FIG. 6.

The second integrated circuit 120 includes a control unit 121, an I/O section 122, an encoding unit 510C, and a transmission unit 522. The control unit 121 executes overall control regarding data processing in the second integrated circuit 120. Accordingly, the I/O section 122, the encoding unit 510C, and the transmission unit 522 operate under control of the control unit 121.

The microphone 200C may receive power via the I/O section 122. Thus, the microphone 200C does not consume power before the operation determination unit 400C generates a trigger signal. Thus, unnecessary power consumption may be prevented or at least reduced.

As described above, the microphone 200C converts voice instructions from the user into audio data. The audio data is output from the microphone 200C to the I/O section 122. The I/O section 122 outputs the audio data to the encoding unit 510C under control of the control unit 121.

The encoding unit 510C encodes the audio data and generates transmission data under control of the control unit 121. The transmission data is output from the encoding unit 510C to the transmission unit 522. The encoding unit 510C and the control unit 121 correspond to the transmission data generation unit 510 described with reference to FIG. 1, FIG. 4, or FIG. 6.

The transmission unit 522 outputs the transmission data under control of the control unit 121. The transmission data is transmitted to a network via the antenna unit 521. The transmission unit 522 may be a communication element used for near field communication (e.g., Bluetooth). As a result, power consumption of the transmission unit 522 is set to low. The transmission unit 522, the antenna unit 521, and the control unit 121 correspond to the transmission unit 520 described with reference to FIG. 1, FIG. 4, or FIG. 6.

Eighth Embodiment

In terms of low power consumption, it is desirable that power supply to a second integrated circuit be stopped after the user inputs voice instructions to a wearable terminal. The user may manually input the completion of voice instructions to the wearable terminal. However, if the user forgets to give instructions to stop power supply, power will be continuously supplied to the second integrated circuit. Thus, preferably, power supply to the second integrated circuit is automatically stopped. In an eighth embodiment, a wearable terminal configured to automatically stop supplying power to the second integrated circuit will be described.

Figure 9:
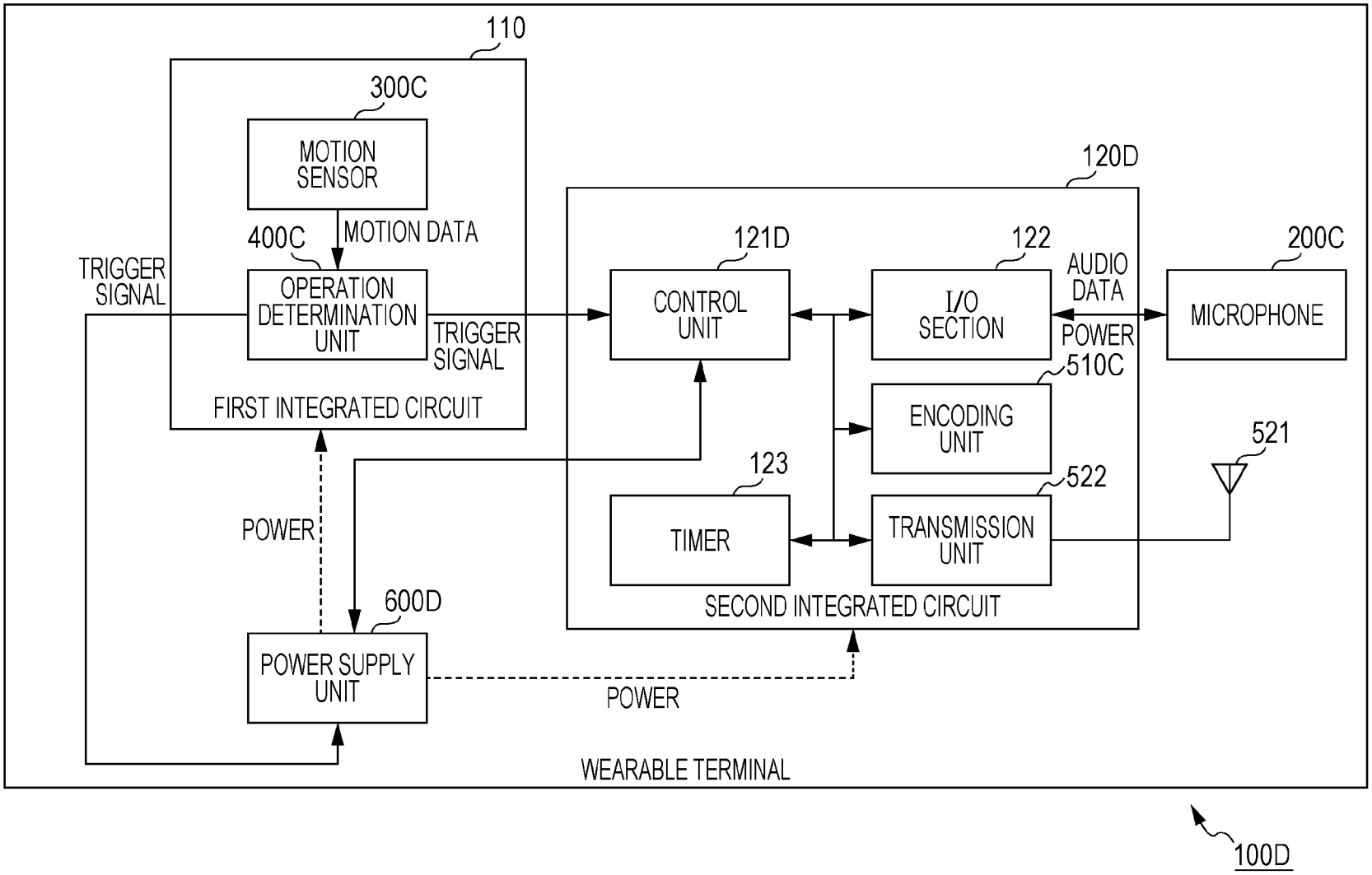
FIG. 9 is a schematic block diagram of a wearable terminal according to an eighth embodiment.

FIG. 9 is a schematic block diagram of a wearable terminal 100D according to the eighth embodiment. The wearable terminal 100D will be described with reference to FIG. 1, FIG. 4, FIG. 6, and FIG. 9. Numerals common to the seventh embodiment and the eighth embodiment designate components having substantially the same features. Thus, these components are identified using the description made in the seventh embodiment.

Similarly to the seventh embodiment, the wearable terminal 100D includes a first integrated circuit 110, a microphone 200C, and an antenna unit 521. These components are identified using the description made in the seventh embodiment.

The wearable terminal 100D further includes a second integrated circuit 120D and a power supply unit 600D. The power supply unit 600D may constantly supply power to the first integrated circuit 110 that is responsible for the sensing and analysis of a motion of the upper limb. On the other hand, the power supply unit 600D does not supply power to the second integrated circuit 120D, which is responsible for communication with a network, when the power supply unit 600D does not receive the trigger signal. When the power supply unit 600D receives the trigger signal, the power supply unit 600D starts supplying power to the second integrated circuit 120D.

When the second integrated circuit 120D receives the trigger signal from the operation determination unit 400C and the second integrated circuit 120D receives power supply from the power supply unit 600D, the second integrated circuit 120D executes data processing to convert the audio data received from the microphone 200C into transmission data. Accordingly, the second integrated circuit 120D corresponds to the data processing unit 500 described with reference to FIG. 1, FIG. 4, or FIG. 6.

Similarly to the seventh embodiment, the second integrated circuit 120D includes an I/O section 122, an encoding unit 510C, and a transmission unit 522. These components are identified using the description made in the seventh embodiment.

The second integrated circuit 120D further includes a control unit 121D and a timer 123. The control unit 121D executes overall control regarding data processing in the second integrated circuit 120D. Accordingly, the I/O section 122, the timer 123, the encoding unit 510C, and the transmission unit 522 operate under control of the control unit 121D.

When the power supply unit 600D receives the trigger signal from the operation determination unit 400C, the power supply unit 600D generates a request signal for requesting the timer 123 to start operating. The request signal is output from the power supply unit 600D to the control unit 121D substantially in synchronization with the start of power supply from the power supply unit 600D to the second integrated circuit 120D. The control unit 121D starts the operation of the timer 123 in accordance with the request signal.

An input period necessary for audio input is preset in the timer 123. When the input period elapses from the time at which the timer 123 starts its operation, the timer 123 notifies the control unit 121D of the completion of the input period. In response to the notification from the timer 123, the control unit 121D generates a control signal for providing instruction to stop power supply. The control signal is output from the control unit 121D to the power supply unit 600D.

The power supply unit 600D stops supplying power to the second integrated circuit 120D in accordance with the control signal from the control unit 121D. This may prevent or reduce unnecessary power consumption of the second integrated circuit 120D after audio is input.

Ninth Embodiment

A wearable terminal may have a user interface function to present information to a user and to receive input from the user. A wearable terminal capable of presenting information useful for users will be effective in use. For example, a wearable terminal that displays the progress of the processing of voice instructions will allow a user to check whether or not audio has been appropriately input. A wearable terminal that receives other input in addition to voice instructions from a user will be able to have a wide range of functions. For example, a wearable terminal that receives manual input of a user will allow the user to perform various operations such as setting a communication path of data transmitted from the wearable terminal and setting priorities for home electric appliances to be controlled. In a ninth embodiment, a wearable terminal having a user interface function will be described.

Figure 10:
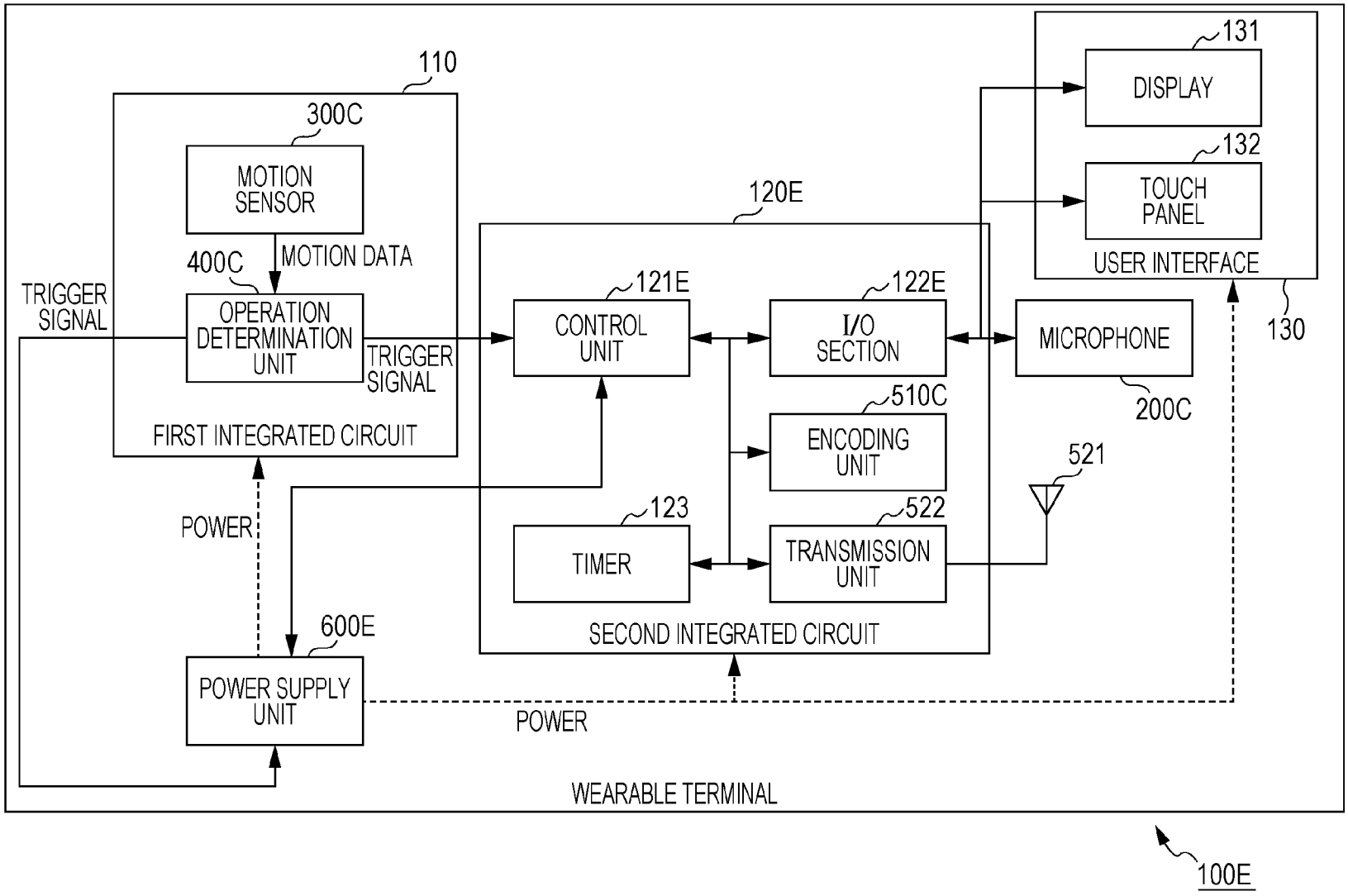
FIG. 10 is a schematic block diagram of a wearable terminal according to a ninth embodiment.

FIG. 10 is a schematic block diagram of a wearable terminal 100E according to the ninth embodiment. The wearable terminal 100E will be described with reference to FIG. 1, FIG. 4, FIG. 6, and FIG. 10. Numerals common to the eighth embodiment and the ninth embodiment designate components having substantially the same features. Thus, these components are identified using the description made in the eighth embodiment.

Similarly to the eighth embodiment, the wearable terminal 100E includes a first integrated circuit 110, a microphone 200C, and an antenna unit 521. These components are identified using the description made in the eighth embodiment.

The wearable terminal 100E further includes a second integrated circuit 120E, a user interface 130, and a power supply unit 600E. The power supply unit 600E may constantly supply power to the first integrated circuit 110 that is responsible for the sensing and analysis of a motion of the upper limb. On the other hand, the power supply unit 600E does not supply power to the second integrated circuit 120E or the user interface 130 when the power supply unit 600E does not receive the trigger signal. When the power supply unit 600E receives the trigger signal, the power supply unit 600E starts supplying power to the second integrated circuit 120E and the user interface 130.

When the second integrated circuit 120E receives the trigger signal from the operation determination unit 400C and the second integrated circuit 120E receives power supply from the power supply unit 600E, the second integrated circuit 120E executes data processing to convert the audio data received by the microphone 200C into transmission data. Accordingly, the second integrated circuit 120E corresponds to the data processing unit 500 described with reference to FIG. 1, FIG. 4, or FIG. 6.

Similarly to the eighth embodiment, the second integrated circuit 120E includes a timer 123, an encoding unit 510C, and a transmission unit 522. These components are identified using the description made in the eighth embodiment.

The second integrated circuit 120E further includes a control unit 121E and an I/O section 122E. The control unit 121E executes overall control regarding data processing in the second integrated circuit 120E. Accordingly, the I/O section 122E, the timer 123, the encoding unit 510C, and the transmission unit 522 operate under control of the control unit 121E.

When the power supply unit 600E receives the trigger signal from the operation determination unit 400C, the power supply unit 600E generates a request signal for requesting the timer 123 to start operating. The request signal is output from the power supply unit 600E to the control unit 121E substantially in synchronization with the start of power supply from the power supply unit 600E to the second integrated circuit 120E. The control unit 121E starts the operation of the timer 123 in accordance with the request signal.

After the timer 123 starts its operation, the control unit 121E may generate display data indicating various pieces of information. The display data is output from the control unit 121E to the user interface 130 via the I/O section 122E. For example, the display data may indicate that the wearable terminal 100E becomes available to receive voice instructions. Alternatively, the display data may indicate a period up to the completion of voice instructions. Alternatively, furthermore, the display data may indicate other information useful for the user. The basic concept of this embodiment is not limited to a specific piece of information indicated by display data.

The user interface 130 includes a display 131 and a touch panel 132. The display 131 displays information indicated by the display data generated by the control unit 121E. This allows the user to visually acquire information provided from the wearable terminal 100E.

The user can operate the touch panel 132 to input various pieces of information to the wearable terminal 100E. The information input by the user through the touch panel 132 is output to the control unit 121E via the I/O section 122E. The control unit 121E may generate various control signals in accordance with the input information from the user. The various control signals may be output to a network via the transmission unit 522 and the antenna unit 521. The basic concept of this embodiment is not limited to the specific content of the input information or specific controlled content defined by the control signal.

Tenth Embodiment

A wearable terminal is not always worn on the upper limb. If the user leaves the wearable terminal after removing it from the upper limb, someone may find the wearable terminal and pick it up. If a third party operates the wearable terminal, a home electric appliance may perform an unwanted operation. It is therefore desirable that only an authorized user be permitted to operate the wearable terminal. In a tenth embodiment, a wearable terminal having an authentication function to verify the authenticity of the user will be described.

Figure 11:
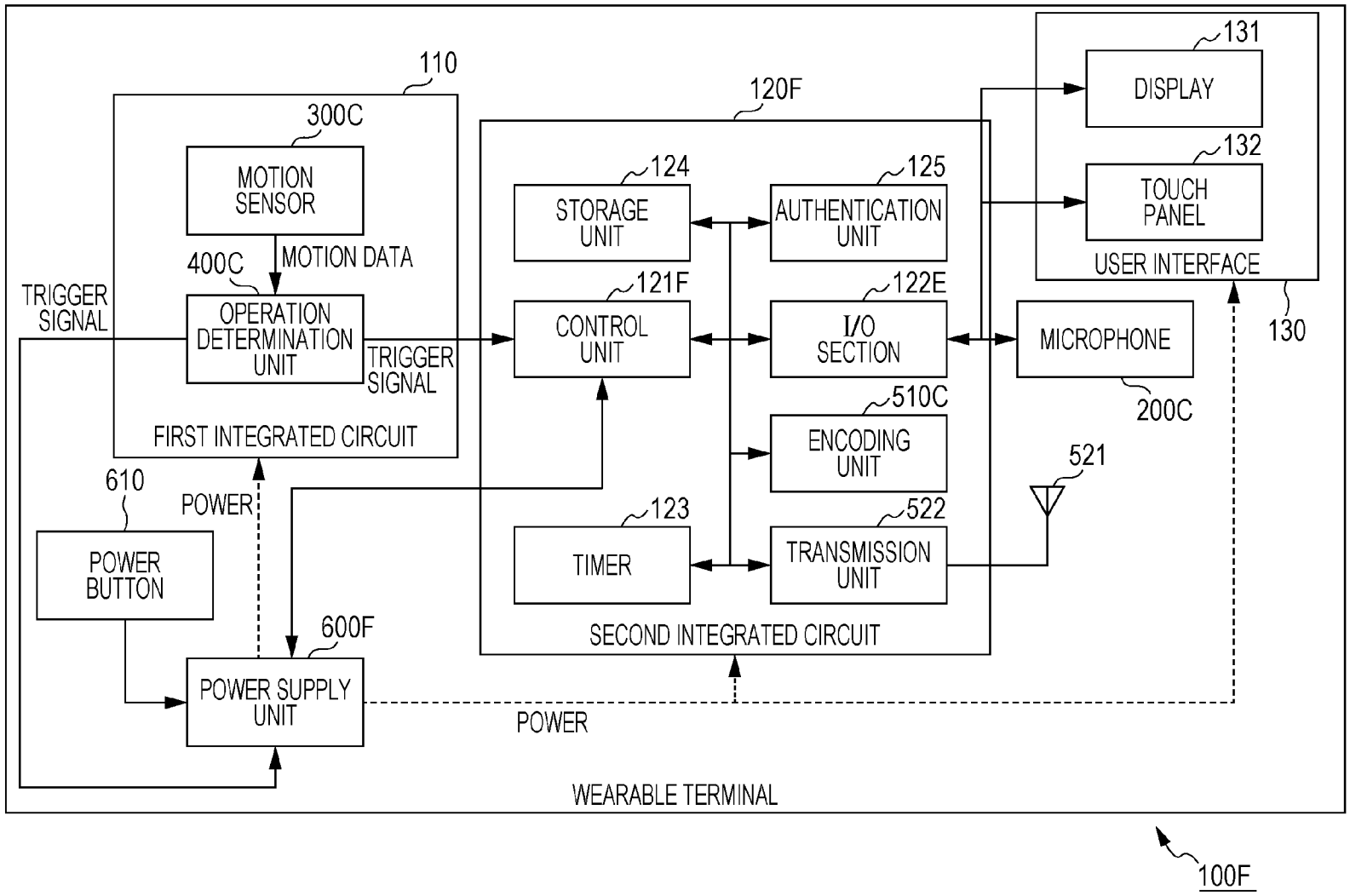
FIG. 11 is a schematic block diagram of a wearable terminal according to a tenth embodiment.

FIG. 11 is a schematic block diagram of a wearable terminal 100F according to the tenth embodiment. The wearable terminal 100F will be described with reference to FIG. 1, FIG. 4, FIG. 6, and FIG. 11. Numerals common to the ninth embodiment and the tenth embodiment designate components having substantially the same features. Thus, These components are identified using the description made in the ninth embodiment.

Similarly to the ninth embodiment, the wearable terminal 100F includes a first integrated circuit 110, a user interface 130, a microphone 200C, and an antenna unit 521. These components are identified using the description made in the ninth embodiment.

The wearable terminal 100F further includes a second integrated circuit 120F, a power supply unit 600F, and a power button 610. When the user operates the power button 610 and requests the wearable terminal 100F to start operating, the power supply unit 600F starts supplying power to the first integrated circuit 110, the second integrated circuit 120F, and the user interface 130. Power is continuously supplied from the power supply unit 600F to the first integrated circuit 110 until the user operates the power button 610 and makes a request to stop power supply from the power supply unit 600F to the first integrated circuit 110.

Similarly to the ninth embodiment, the second integrated circuit 120F includes an I/O section 122E, a timer 123, an encoding unit 510C, and a transmission unit 522. These components are identified using the description made in the ninth embodiment.

The second integrated circuit 120F further includes a control unit 121F, a storage unit 124, and an authentication unit 125. The control unit 121F executes overall control regarding data processing in the second integrated circuit 120F. Accordingly, the I/O section 122E, the timer 123, the storage unit 124, the authentication unit 125, the encoding unit 510C, and the transmission unit 522 operate under control of the control unit 121F.

The control unit 121F may generate display data to request the user to enter a password. The display data is output from the control unit 121F to the display 131 via the I/O section 122E. As a result, the display 131 displays an image to request the user to enter a password.

In response to the password request image on the display 131, the user operates the touch panel 132 and enters a password. Authentication information indicating the entered password is output from the touch panel 132 to the I/O section 122E. The I/O section 122E outputs the authentication information to the authentication unit 125 under control of the control unit 121F.

The storage unit 124 stores a password preset by the user. Upon receipt of the authentication information, the authentication unit 125 reads the password from the storage unit 124. After that, the authentication unit 125 compares the authentication information with the read password.

If the authentication information matches the read password, the authentication unit 125 notifies the control unit 121F of successful completion of the authentication. Then, the control unit 121F may generate display data indicating that the authentication has been successfully completed. The display data is output from the control unit 121F to the display 131 via the I/O section 122E. As a result, the display 131 displays an image indicating successful completion of the authentication process.

If the authentication information does not match the read password, the authentication unit 125 notifies the control unit 121F that the authentication has failed. Then, the control unit 121F may generate display data to prompt the user to re-enter a password and/or to prompt interruption of authentication. The display data is output from the control unit 121F to the display 131 via the I/O section 122E. As a result, the display 131 displays an image to prompt the user to re-enter a password and/or prompt interruption of authentication. In response to the displayed image, the user operates the touch panel 132 and re-enters a password. Alternatively, in response to the displayed image, the user operates the touch panel 132 and requests the wearable terminal 100F to interrupt the authentication process. The request for the interruption of the authentication process, which is input via the touch panel 132, is output from the touch panel 132 to the control unit 121F via the I/O section 122E.

After display data indicating the completion of the authentication is output to the display 131 or after the control unit 121F receives the request for the interruption of the authentication process, the control unit 121F generates a control signal for requesting that power supply be stopped. The control signal is output from the control unit 121F to the power supply unit 600F. As a result, the power supply unit 600F stops supplying power to the second integrated circuit 120F and the user interface 130 while continuously supplying power to the first integrated circuit 110.

After that, when the user gives a predetermined motion to the upper limb, the operation determination unit 400C generates a trigger signal. The trigger signal is output from the operation determination unit 400C to the second integrated circuit 120F and the power supply unit 600F. When the power supply unit 600F receives the trigger signal, the power supply unit 600F resumes supplying power to the second integrated circuit 120F and the user interface 130.

When the power supply unit 600F receives the trigger signal from the operation determination unit 400C, the power supply unit 600F generates a request signal for requesting the timer 123 to start operating. The request signal is output from the power supply unit 600F to the control unit 121F substantially in synchronization with the start of power supply from the power supply unit 600F to the second integrated circuit 120F. The control unit 121F starts the operation of the timer 123 in accordance with the request signal.

When the second integrated circuit 120F receives the trigger signal from the operation determination unit 400C and the second integrated circuit 120F receives power supply from the power supply unit 600F, the second integrated circuit 120F executes data processing to convert the audio data received from the microphone 200C into transmission data. Accordingly, the second integrated circuit 120F corresponds to the data processing unit 500 described with reference to FIG. 1, FIG. 4, or FIG. 6.

If user authentication is successful, the result of the user authentication may be kept valid until the wearable terminal 100F is removed from the upper limb. This may avoid inconveniencing the user with frequent authentication operations in the manner described above.

The wearable terminal 100F starts the authentication process in response to the operation of the power button 610. Alternatively, the authentication process may be started when the wearable terminal 100F is worn on the upper limb. Accordingly, the basic concept of this embodiment is not limited to a specific operation to start the authentication process.

The wearable terminal 100F uses a password for user authentication. Alternatively, any other authentication technique may be used for user authentication. Biometric authentication techniques such as a voice print authentication technique, a fingerprint authentication technique, and an iris authentication technique may be used for user authentication. Alternatively, a blood pressure measurement technique or a pulse measurement technique may be used for user authentication. By comparing a blood pressure measured in the authentication process and/or a pulse rate measured in the authentication process with previous measurement data of blood pressure or pulse rate, a wearable terminal can determine whether or not a person who is going to use the wearable terminal is an authorized user. Accordingly, the basic concept of this embodiment is not limited to any specific authentication technique.

Eleventh Embodiment

The wearable terminal described in connection with the tenth embodiment is configured to execute various operations. In an eleventh embodiment, an illustrative operation of the wearable terminal will be described.

Figure 12:
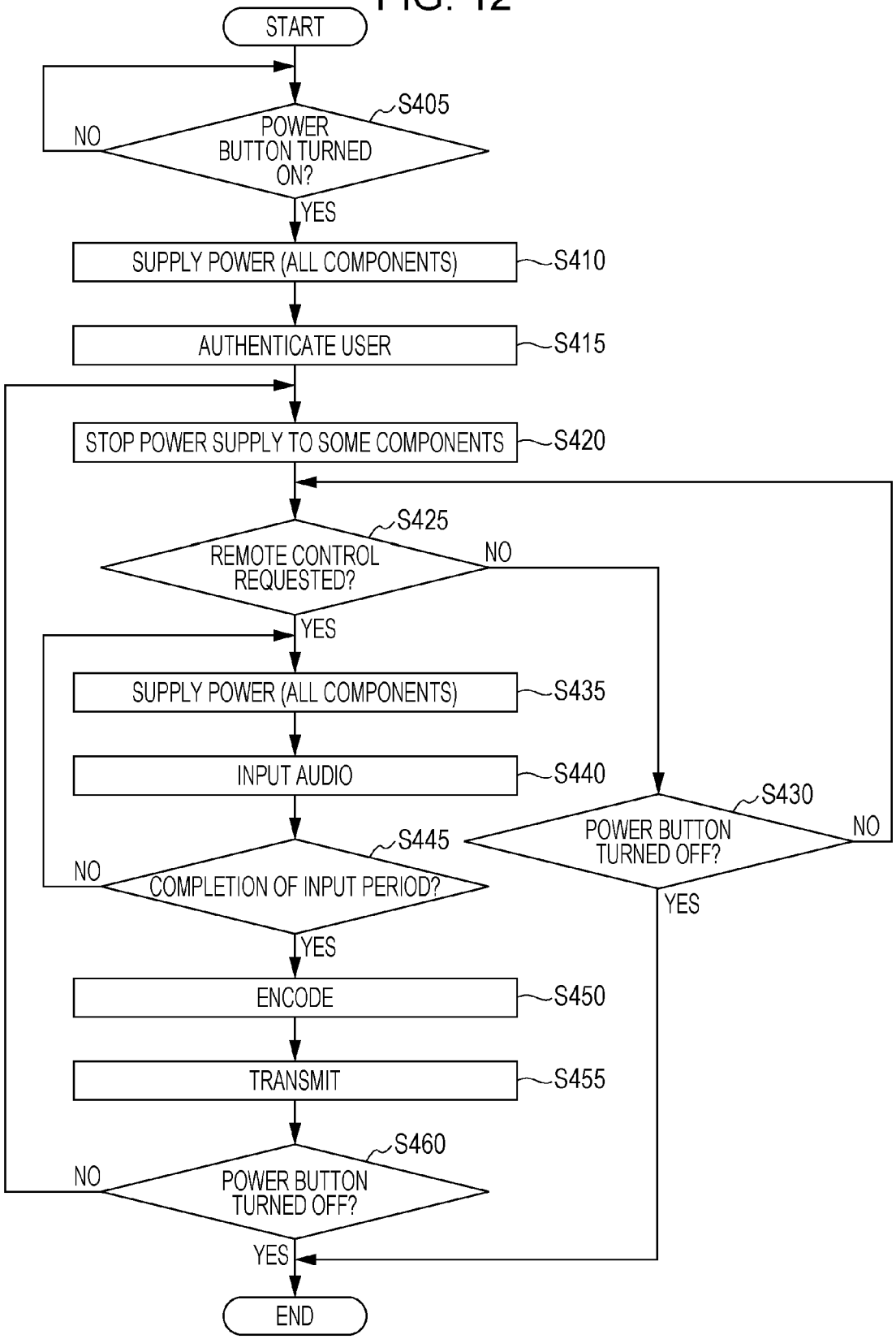
FIG. 12 is a schematic flowchart of an illustrative operation of the wearable terminal illustrated in FIG. 11 (eleventh embodiment)

FIG. 12 is a schematic flowchart of an illustrative operation of the wearable terminal 100F. The operation performed in the wearable terminal 100F will be described with reference to FIG. 3, FIG. 5, FIG. 7, FIG. 11, and FIG. 12.

Step S405

In step S405, the user operates the power button 610, and requests the wearable terminal 100F to start operating. Step S405 is continuously performed until the user requests the wearable terminal 100F to start operating. When the user requests the wearable terminal 100F to start operating, step S410 is executed.

Step S410

In step S410, the power supply unit 600F starts supplying power to the first integrated circuit 110, the second integrated circuit 120F, and the user interface 130. After that, step S415 is executed.

Step S415

In step S415, the authentication process described in connection with the tenth embodiment is performed. If the wearable terminal 100F successfully authenticates the user, step S420 is executed.

Step S420

In step S420, the power supply unit 600F stops supplying power to the second integrated circuit 120F and the user interface 130. On the other hand, the power supply unit 600F continuously supplies power to the first integrated circuit 110. After that, step S425 is executed.

Step S425

In step S425, the operation determination unit 400C determines whether or not the user has requested remote control of a home electric appliance. That is, in step S425, the determination step described with reference to FIG. 3 is executed. As described with reference to FIG. 5, in the determination step, an acceleration may be compared with an acceleration threshold (step S230 of FIG. 5). Additionally, motion data obtained from the motion sensor 300C may be compared with pattern data stored in advance (step S240 of FIG. 5). Alternatively, as described with reference to FIG. 7, in the determination step, comparison between a rotation angle and a rotation angle threshold may be performed (step S350 of FIG. 7). The basic concept of this embodiment is not limited to a specific determination technique.

If the operation determination unit 400C determines that the user has not requested remote control of a home electric appliance, step S430 is executed. If the operation determination unit 400C determines that the user has requested remote control of a home electric appliance, step S435 is executed.

Step S430

In step S430, the power supply unit 600F determines whether or not the user has operated the power button 610 to stop power supply. If the user has operated the power button 610 to stop power supply, the wearable terminal 100F ends the operation. Otherwise, step S425 is executed.

Step S435

In step S435, the operation determination unit 400C generates a trigger signal. The trigger signal is output from the operation determination unit 400C to the power supply unit 600F and the control unit 121F. The power supply unit 600F resumes supplying power to the second integrated circuit 120F and the user interface 130 in accordance with the trigger signal. The control unit 121F starts the operation of the timer 123 in accordance with the trigger signal. After that, step S440 is executed.

Step S440

In step S440, the user gives voice instructions to the wearable terminal 100F to control a home electric appliance. The voice instructions are converted into an electrical signal (audio data) by the microphone 200C. The audio data is output to the encoding unit 510C via the I/O section 122E. After that, step S445 is executed.

Step S445

In step S445, the control unit 121F determines whether or not an input period preset for audio input has been completed. If the control unit 121F receives a notification of the completion of the input period from the timer 123, step S450 is executed. Alternatively, the control unit 121F may receive a notification indicating that an encoding process is completed from the encoding unit 510C. Also in this case, step S450 is executed. Otherwise, step S435 is executed.

Step S450

In step S450, the encoding unit 510C encodes the audio data, and generates transmission data. The transmission data is output from the encoding unit 510C to the transmission unit 522. After that, step S455 is executed.

Step S455

In step S455, the transmission unit 522 transmits the transmission data from the antenna unit 521. After that, step S460 is executed.

Step S460

In step S460, the power supply unit 600F determines whether or not the user has operated the power button 610 to stop power supply. If the user has operated the power button 610 to stop power supply, the wearable terminal 100F ends the operation. Otherwise, step S420 is executed.

Twelfth Embodiment

A wearable terminal is configured to be wearable on the upper limb of a user. A communication device that the user carries relays transmission data generated by the wearable terminal, allowing a reduction in power consumption of the wearable terminal to transmit the transmission data. In a twelfth embodiment, a communication technology that does not cause excessive power consumption of a wearable terminal will be described.

Figure 13:
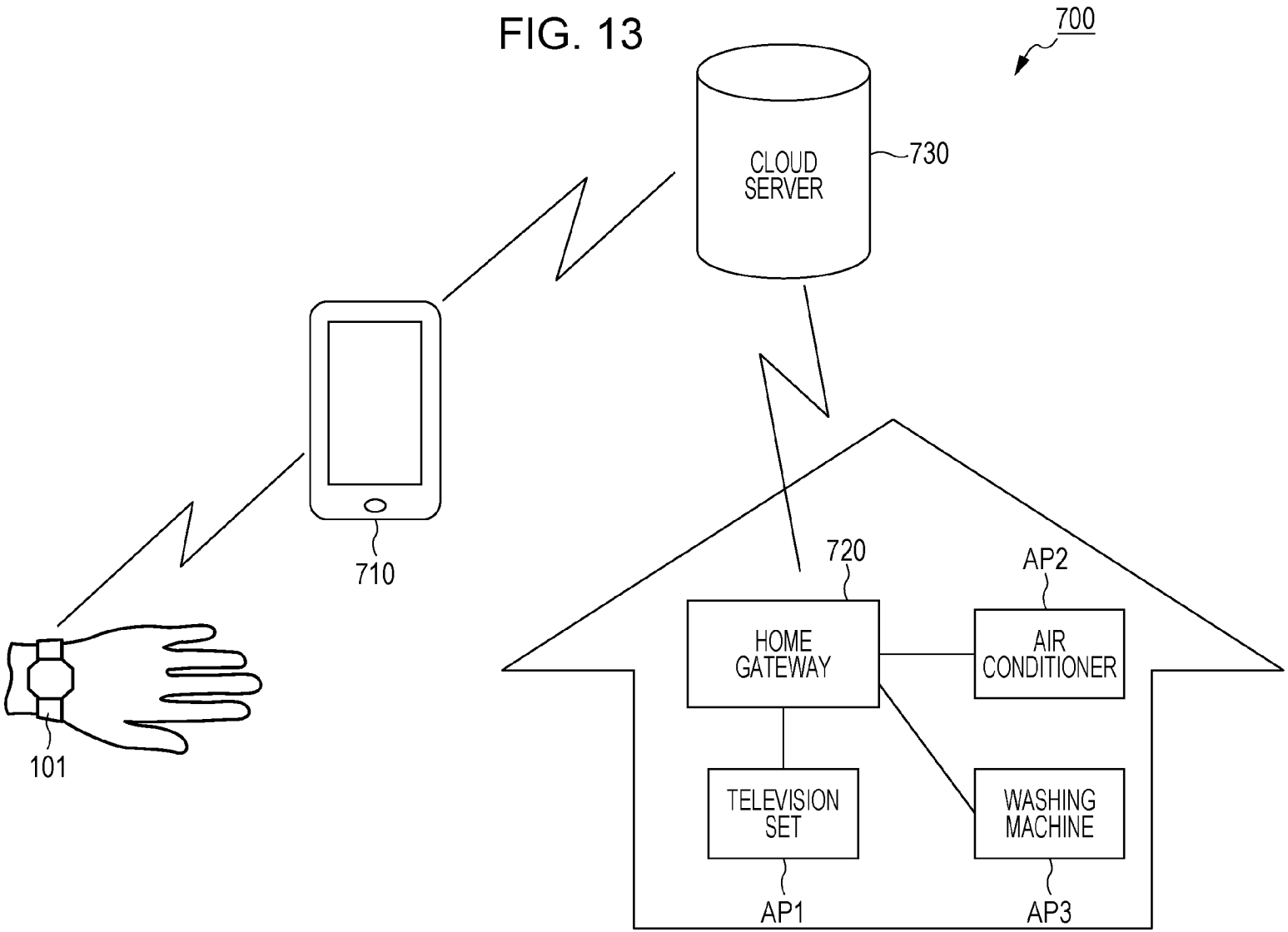
FIG. 13 is a conceptual diagram of a control system according to a twelfth embodiment.

FIG. 13 is a conceptual diagram of a control system 700 according to the twelfth embodiment. The control system 700 will be described with reference to FIG. 1, FIG. 4, FIG. 6, FIG. 8 to FIG. 11, and FIG. 13.

The control system 700 controls various home electric appliances. FIG. 13 illustrates home electric appliances including a television set AP1, an air conditioner AP2, and a washing machine AP3. The basic concept of this embodiment is not limited to a specific home electric appliance controlled by the control system 700.

The control system 700 includes a wearable terminal 101, a smartphone 710, a home gateway 720, and a cloud server 730. The wearable terminal 101 may be one of the wearable terminals 100, 100A, 100B, 100C, 100D, 100E, and 100F described with reference to FIG. 1, FIG. 4, FIG. 6, and FIG. 8 to FIG. 11. The wearable terminal 101 is worn on the wrist of a user who stays outdoors. Alternatively, the wearable terminal 101 may be worn on any other portion of the upper limb of the user (e.g., the finger). The basic concept of this embodiment is not limited to a specific position at which a wearable terminal is worn.

Both the wearable terminal 101 and the smartphone 710 are communication devices that the user carries, and the wearable terminal 101 is capable of transmitting transmission data indicating voice instructions from the user to the smartphone 710 using near field communication technology such as Bluetooth. Thus, the wearable terminal 101 does not require excessively high power consumption to transmit transmission data.

The smartphone 710 is capable of communicating with the cloud server 730 via a base station (not illustrated) using a radio communication technology (e.g., wideband code division multiple access (W-CDMA) or long term evolution (LTE)) with wide coverage. The communication between the smartphone 710 and the cloud server 730 may be based on various existing communication technologies. Accordingly, the basic concept of this embodiment is not limited to a specific communication technology used for communication between the smartphone 710 and the cloud server 730.

The transmission data generated by the wearable terminal 101 is transmitted to the cloud server 730 via the smartphone 710. When the cloud server 730 receives the transmission data, the cloud server 730 applies a decoding process to the transmission data. After that, the cloud server 730 analyzes the decoded transmission data. The cloud server 730 may use various speech recognition techniques for the analysis of the transmission data. The basic concept of this embodiment is not limited to a specific speech recognition technique.

The cloud server 730 generates control data based on the result of the analysis of the transmission data. The control data may include information concerning a home electric appliance to be controlled which is specified by the voice instructions made by the user, and other information necessary for the content of control that is specified by the voice instructions made by the user or necessary to control the home electric appliance. For example, when the user gives voice instructions to the wearable terminal 101 to "operate the air conditioner at a set temperature of 25° C.", the control data generated by the cloud server 730 designates "the air conditioner AP2" as the target of control, and specifies the "operation at a set temperature of 25° C." as the content of the control.

The control data is transmitted from the cloud server 730 to the home gateway 720. The home gateway 720 transfers the control data to the home electric appliance specified by the control data. As described above, if the control data specifies "the air conditioner AP2", the home gateway 720 transfers the control data to the air conditioner AP2. If the control data specifies the "operation at a set temperature of 25° C.", the air conditioner AP2 operates at a set temperature of 25° C.

Thirteenth Embodiment

A wearable terminal may be configured to receive a radio wave output from any other mobile terminal or a radio wave output from a home electric appliance. In this case, wearable terminal may provide information concerning the received radio wave to a network. As a result, an appropriate communication path is set for transmission data to be output from the wearable terminal. In a thirteenth embodiment, a wearable terminal configured to receive a radio wave output from any other mobile terminal or a radio wave output from a home electric appliance will be described.

Figure 14:
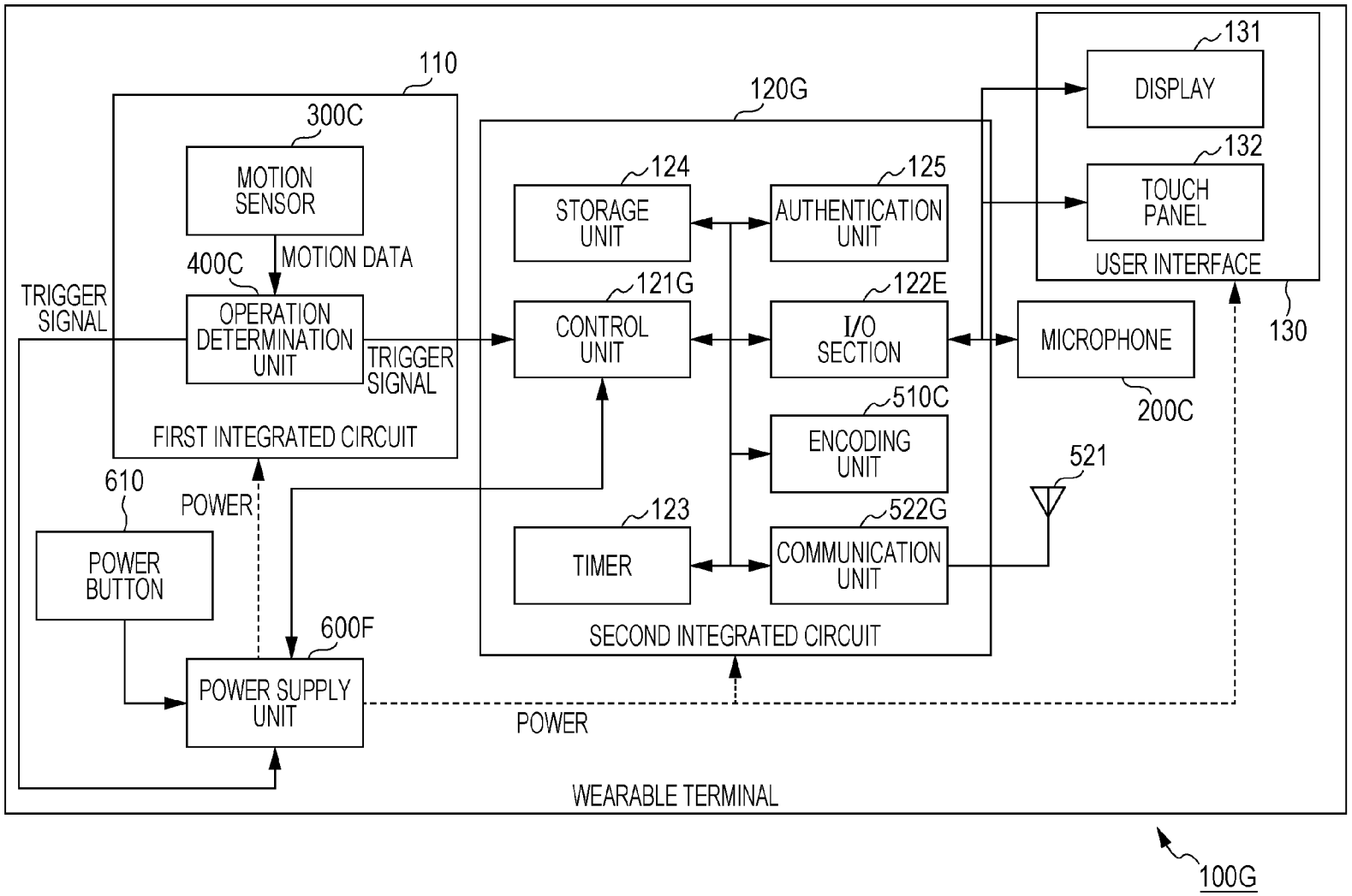
FIG. 14 is a schematic block diagram of a wearable terminal according to a thirteenth embodiment.

FIG. 14 is a schematic block diagram of a wearable terminal 100G according to the thirteenth embodiment. The wearable terminal 100G will be described with reference to FIG. 14. Numerals common to the tenth embodiment and the thirteenth embodiment designate components having substantially the same features. Thus, these components are identified using the description made in the tenth embodiment.

Similarly to the tenth embodiment, the wearable terminal 100G includes a first integrated circuit 110, a user interface 130, a microphone 200C, an antenna unit 521, a power supply unit 600F, and a power button 610. These components are identified using the description made in the tenth embodiment.

The wearable terminal 100G further includes a second integrated circuit 120G. Similarly to the tenth embodiment, the second integrated circuit 120G executes processes such as generation of transmission data, control of the user interface 130, and user authentication. The processing operation described in connection with the tenth embodiment is used to indicate the operation of the second integrated circuit 120G.

Similarly to the tenth embodiment, the second integrated circuit 120G includes an I/O section 122E, a timer 123, a storage unit 124, an authentication unit 125, and an encoding unit 510C. These components are identified using the description made in the tenth embodiment.

The second integrated circuit 120G further includes a control unit 121G and a communication unit 522G. Similarly to the tenth embodiment, the communication unit 522G transmits the transmission data via the antenna unit 521. Additionally, the communication unit 522G generates a signal from the radio wave received by the antenna unit 521. The generated signal is output from the communication unit 522G to the control unit 121G.

The control unit 121G determines, based on the signal received from the communication unit 522G, whether or not there are a plurality of devices capable of communicating with the wearable terminal 100G. If the control unit 121G determines that there are a plurality of devices capable of communicating with the wearable terminal 100G, the control unit 121G may generate a request signal for selecting a communication destination of the wearable terminal 100G. The request signal is transmitted to a network via the communication unit 522G and the antenna unit 521.

Figure 15:
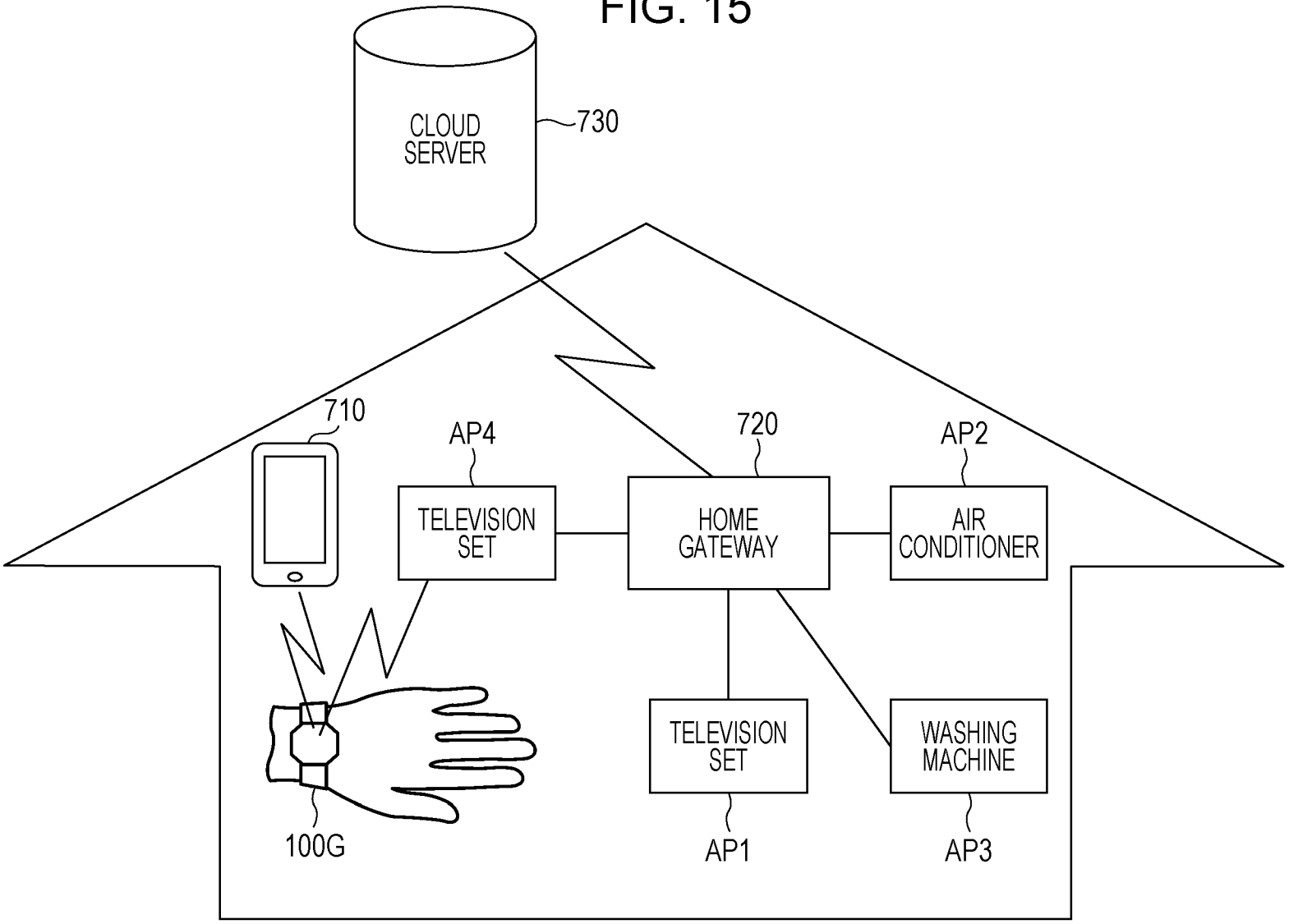
FIG. 15 is a schematic diagram illustrating an illustrative use environment of the wearable terminal illustrated in FIG. 14.

FIG. 15 is a schematic diagram illustrating an illustrative use environment of the wearable terminal 100G. A technique for selecting a communication destination of the wearable terminal 100G will be described with reference to FIG. 14 and FIG. 15. Numerals common to the twelfth embodiment and the thirteenth embodiment designate components having substantially the same features. Thus, these components are identified using the description made in the twelfth embodiment.

FIG. 15 illustrates home electric appliances including television sets AP1 and AP4, an air conditioner AP2, and a washing machine AP3. The basic concept of this embodiment is not limited to a specific home electric appliance to be controlled.

The wearable terminal 100G is worn on the wrist of a user who is at home. Alternatively, the wearable terminal 100G may be worn on any other portion of the upper limb of the user (e.g., the finger). The basic concept of this embodiment is not limited to a specific position at which a wearable terminal is worn.

The antenna unit 521 of the wearable terminal 100G receives not only a radio wave from the smartphone 710 but also a radio wave from the television set AP4. The control unit 121G is configured to determine that the smartphone 710 and the television set AP4 exist as devices with which the wearable terminal 100G is capable of communicating. Similarly to the twelfth embodiment, the communication between the wearable terminal 100G and the smartphone 710 may be based on near field radio technology (e.g., Bluetooth). Similarly, the communication between the wearable terminal 100G and the television set AP4 may also be based on near field radio technology.

The control unit 121G generates a request signal for requesting that one of the smartphone 710 and the television set AP4 be determined as a communication destination. The request signal may be transmitted from the wearable terminal 100G to the cloud server 730 via the smartphone 710. Alternatively, the request signal may be transmitted from the wearable terminal 100G to the cloud server 730 via the television set AP4.

The cloud server 730 may determine one of the smartphone 710 and the television set AP4 as a communication destination on the basis of a predetermined determination standard. The cloud server 730 generates a communication destination signal indicating the determined communication destination. The communication destination signal may be transmitted from the cloud server 730 to the wearable terminal 100G via the smartphone 710. Alternatively, the communication destination signal may be transmitted from the cloud server 730 to the wearable terminal 100G via the television set AP4.

Since the television set AP4 is connected to the home gateway 720 via a wired local area network (LAN), the cloud server 730 may determine the television set AP4 as the communication destination of the wearable terminal 100G because of the wide communication band. Alternatively, the cloud server 730 may determine the communication destination of the wearable terminal 100G on the basis of any other determination standard. The basic concept of this embodiment is not limited to a specific determination standard.

The user, instead of the cloud server 730, may determine the communication destination of the wearable terminal 100G. The control unit 121G may display information concerning candidate communication destinations (in the use environment illustrated in FIG. 13, the smartphone 710 and the television set AP4) on the display 131. The user may operate the touch panel 132 and designate one of the smartphone 710 and the television set AP4 as the communication destination of the wearable terminal 100G. Alternatively, furthermore, the candidate communication destinations may be displayed on the smartphone 710. The user may operate the smartphone 710 and designate one of the smartphone 710 and the television set AP4 as the communication destination of the wearable terminal 100G.

At least one of the cloud server 730, the smartphone 710, and the wearable terminal 100G may have a function to determine a communication destination. Alternatively, the television sets AP1 and AP4, the air conditioner AP2, the washing machine AP3, and the home gateway 720 may have a function to determine a communication destination.

Fourteenth Embodiment

While the user operates a communication device located around a wearable terminal or as the user moves, the communication environment surrounding the wearable terminal may change. It is therefore desirable that the communication destination of the wearable terminal be reset in accordance with a change in communication environment. In a fourteenth embodiment, a technique for resetting a communication destination in accordance with a change in communication environment will be described.

Figure 16A:
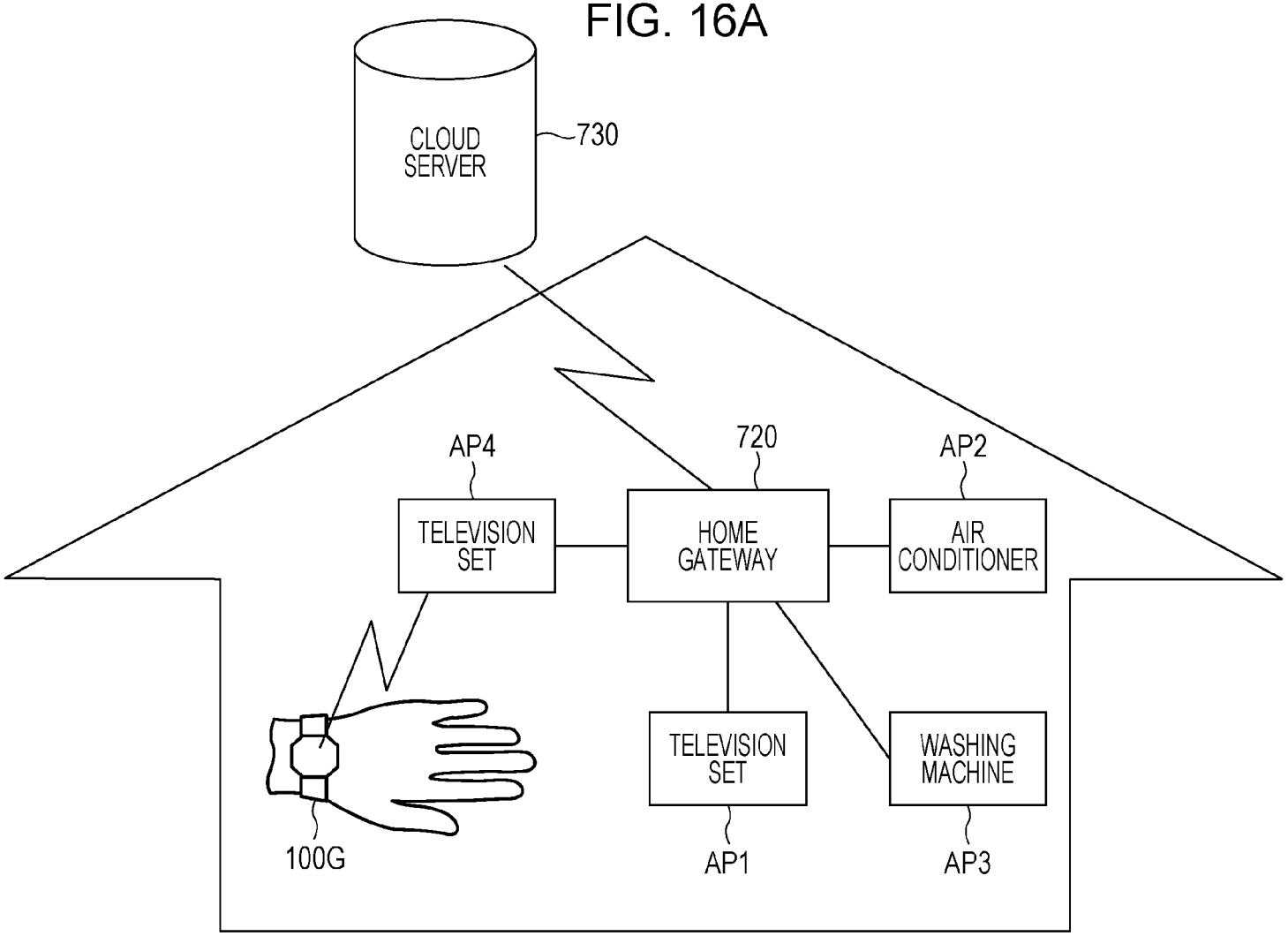
FIG. 16A is a schematic diagram illustrating an illustrative use environment of the wearable terminal illustrated in FIG. 14 (fourteenth embodiment)
Figure 16B:
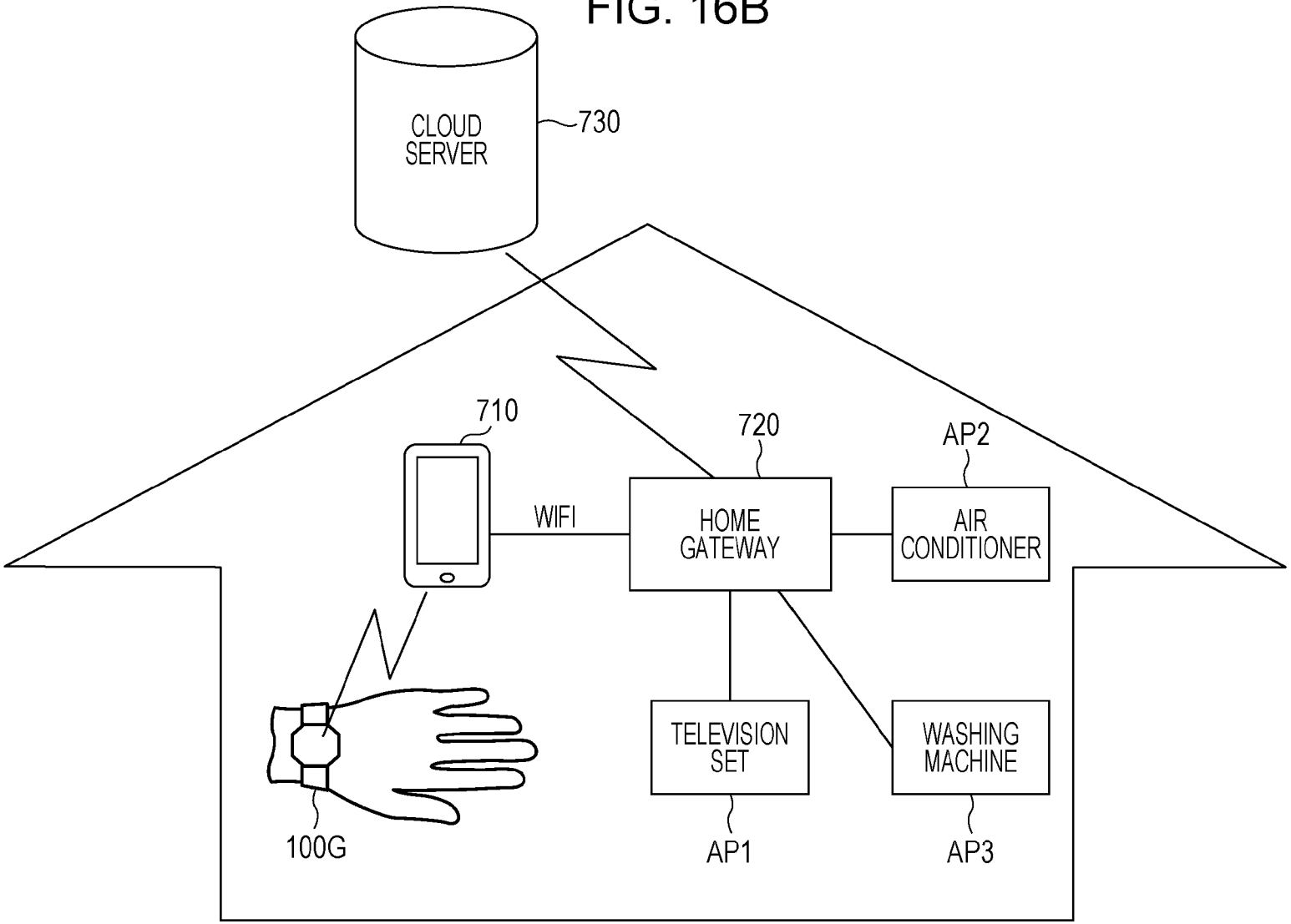
FIG. 16B is a schematic diagram illustrating an illustrative use environment of the wearable terminal illustrated in FIG. 14 (fourteenth embodiment)

FIG. 16A and FIG. 16B are schematic diagrams illustrating an illustrative use environment of the wearable terminal 100G. A technique for changing the communication destination of the wearable terminal 100G will be described with reference to FIG. 14, FIG. 16A, and FIG. 16B. Numerals common to the thirteenth embodiment and fourteenth embodiment designate components having substantially the same features. Thus, these components are identified using the description made in the thirteenth embodiment.

FIG. 16A illustrates home electric appliances including television sets AP1 and AP4, an air conditioner AP2, and a washing machine AP3. The basic concept of this embodiment is not limited to a specific home electric appliance to be controlled.

The television set AP4 is selected as the communication destination of the wearable terminal 100G in accordance with the basic concept described in connection with the thirteenth embodiment. In this case, the user sets the communication scheme of the smartphone 710 to W-CDMA or LTE.

After that, the user changes the communication scheme of the smartphone 710 to wireless fidelity (WiFi). As a result, a WiFi connection is established between the smartphone 710 and the home gateway 720.

The antenna unit 521 of the wearable terminal 100G receives a radio wave used for WiFi connection. As a result, the control unit 121G can sense the change in the communication environment surrounding the wearable terminal 100G. The control unit 121G generates a request signal for requesting the selection of the communication destination of the wearable terminal 100G. The request signal is transmitted to the cloud server 730 via the communication unit 522G and the antenna unit 521.

The cloud server 730 is set so as to select a communication device with a wide communication band as the communication destination of the wearable terminal 100G. The WiFi connection between the smartphone 710 and the home gateway 720 has a wider band than the communication connection between the television set AP4 and the home gateway 720. Thus, the cloud server 730 switches the communication destination of the wearable terminal 100G from the television set AP4 to the smartphone 710.

Fifteenth Embodiment

Communication devices available as communication destinations of a wearable terminal may be registered in advance in a cloud server. Priorities may be set in advance for the communication devices registered in the cloud server. In a fifteenth embodiment, a technique for setting a communication destination in accordance with the preset priorities will be described.

Figure 17:
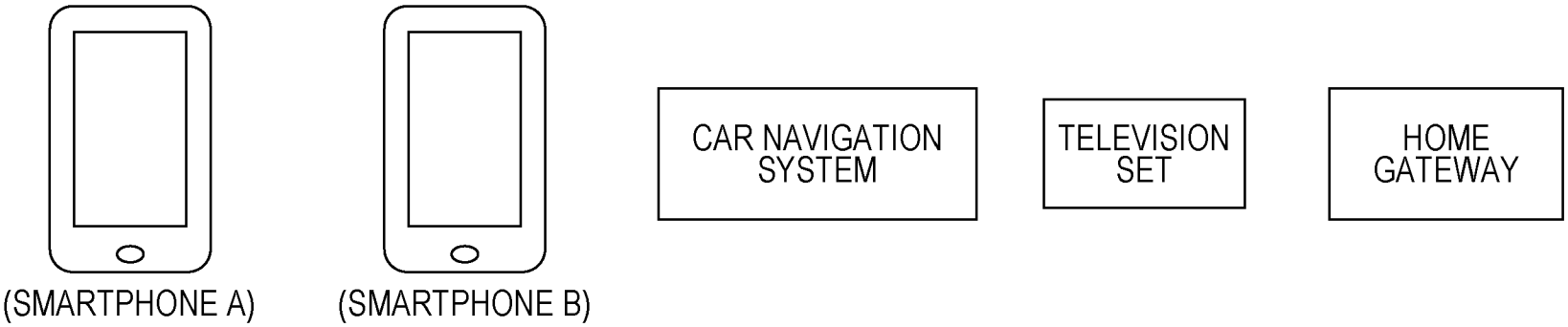
FIG. 17 is a schematic diagram illustrating communication devices registered in a cloud server as communication destinations of the wearable terminal illustrated in FIG. 14 (fifteenth embodiment)

FIG. 17 is a schematic diagram illustrating communication devices registered as communication destinations of the wearable terminal 100G in the cloud server 730. A technique for setting the communication destination of the wearable terminal 100G will be described with reference to FIG. 14, FIG. 15, and FIG. 17.

FIG. 17 illustrates a smartphone A, a smartphone B, a car navigation system, a television set, and a home gateway. The smartphone A, the smartphone B, the car navigation system, the television set, and the home gateway are each configured to be connected to the wearable terminal 100G so as to be able to communicate with the wearable terminal 100G using near field radio technology.

The cloud server 730 stores information (e.g., a communication address) on each of the smartphone A, the smartphone B, the car navigation system, the television set, and the home gateway. The cloud server 730 selects the communication destination of the wearable terminal 100G from the smartphone A, the smartphone B, the car navigation system, the television set, and the home gateway.

FIG. 18 is a table showing priorities set in the cloud server 730. The technique for setting the communication destination of the wearable terminal 100G will further be described with reference to FIG. 14, FIG. 15, FIG. 17, and FIG. 18.

As described in connection with the fourteenth embodiment, the wearable terminal 100G is configured to transfer information concerning the communication environment surrounding the wearable terminal 100G to the cloud server 730. The cloud server 730 may determine where the user is, using the information concerning the communication environment. If the information concerning the communication environment indicates the presence of a radio wave from the car navigation system, the cloud server 730 may determine that the user is in a vehicle. If the information concerning the communication environment indicates the presence of a radio wave from the television set or the home gateway, the cloud server 730 may determine that the user is at home. If the information concerning the communication environment indicates the presence of only a radio wave from the smartphone A and/or the smartphone B, the cloud server 730 may determine that the user is away from home. The wearable terminal 100G may have a global positioning system (GPS) function. In this case, the cloud server 730 may determine where the user is, based on GPS information from the wearable terminal 100G. The basic concept of this embodiment is not limited to a specific technique for detecting where the user is.

In the setting of the priorities illustrated in FIG. 18, when determining that the user is in a vehicle, the cloud server 730 sets the communication destination of the wearable terminal 100G to the car navigation system. When determining that the user is at home, the cloud server 730 sets the communication destination of the wearable terminal 100G to the television set. If the wearable terminal 100G is not in an environment where communication with the television set is possible, the cloud server 730 changes the communication destination of the wearable terminal 100G from the television set to the home gateway. If the wearable terminal 100G is not in an environment where communication with the home gateway is also possible, the cloud server 730 changes the communication destination of the wearable terminal 100G from the home gateway to the smartphone A. When determining that the user is away from home, the cloud server 730 sets the communication destination of the wearable terminal 100G to the smartphone A. If the wearable terminal 100G is not in an environment where communication with the smartphone A is possible, the cloud server 730 changes the communication destination of the wearable terminal 100G from the smartphone A to the smartphone B.

The priorities of the communication destinations may be set by the user. For example, the user may operate the touch panel 132 of the wearable terminal 100G and set and/or change the priorities of the communication destinations. Alternatively, the user may use a smartphone or any other communication device to set and/or change the priorities.

Sixteenth Embodiment

A wearable terminal that communicates with any other communication device using near field communication technology (e.g., Bluetooth) will not consume an excessively large amount of power for communication. However, a communication device capable of communicating with the wearable terminal may not necessarily be within a communication range covered by near field communication technology. Accordingly, the communication coverage area of the wearable terminal may be changed in accordance with the use environment. In a sixteenth embodiment, a wearable terminal configured to change its communication coverage area will be described.

Figure 19:
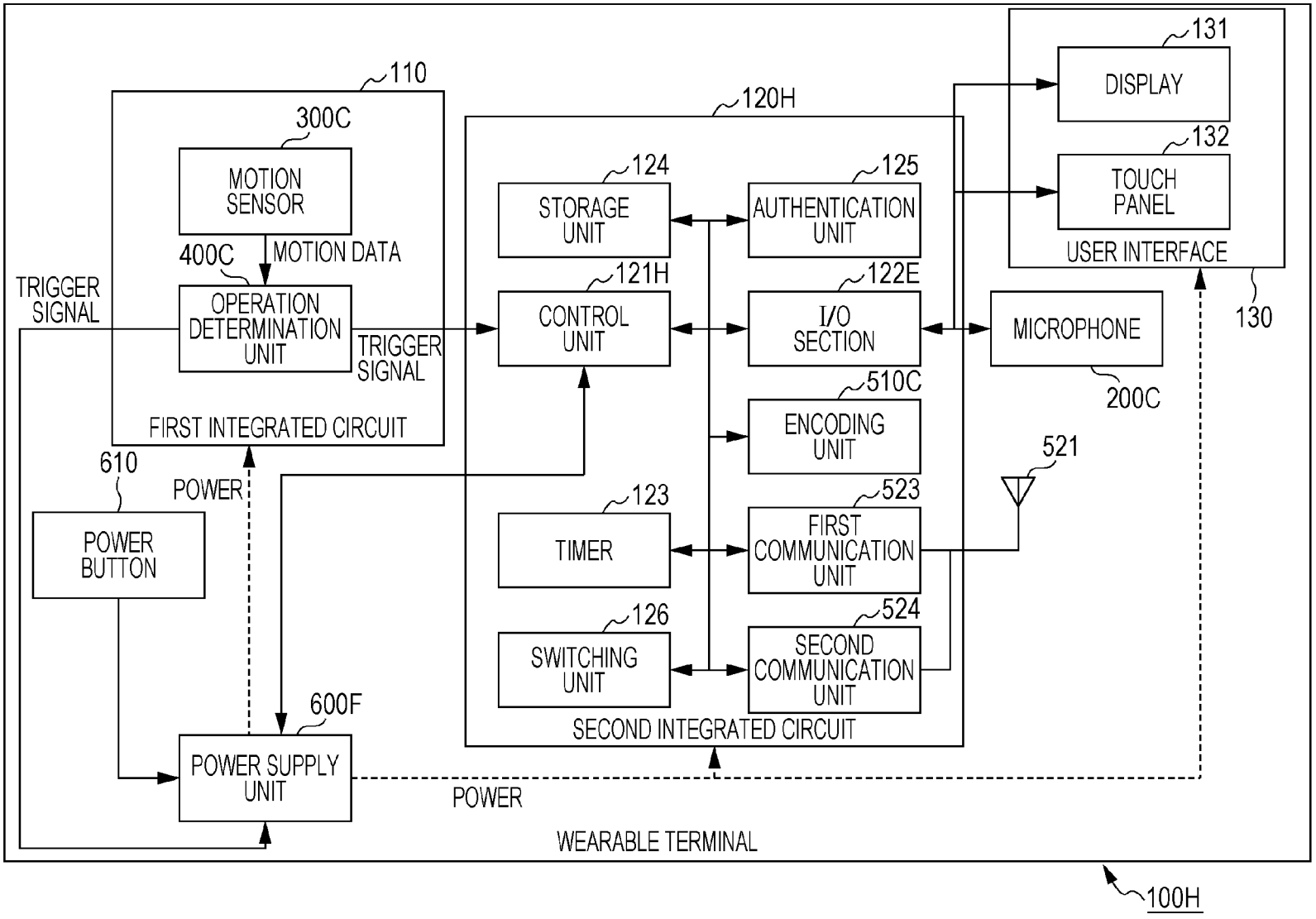
FIG. 19 is a schematic block diagram of a wearable terminal according to a sixteenth embodiment.

FIG. 19 is a schematic block diagram of a wearable terminal 100H according to the sixteenth embodiment. The wearable terminal 100H will be described with reference to FIG. 18 and FIG. 19. Numerals common to the thirteenth embodiment and the sixteenth embodiment designate components having substantially the same features. Thus, these components are identified using the description made in the thirteenth embodiment.

Similarly to the thirteenth embodiment, the wearable terminal 100H includes a first integrated circuit 110, a user interface 130, a microphone 200C, an antenna unit 521, a power supply unit 600F, and a power button 610. These components are identified using the description made in the thirteenth embodiment.

The wearable terminal 100H further includes a second integrated circuit 120H. Similarly to the thirteenth embodiment, the second integrated circuit 120H executes processes such as generation of transmission data, the control of the user interface 130, and user authentication. The processing operation described in connection with the thirteenth embodiment is used to indicate the operation of the second integrated circuit 120H.

Similarly to the thirteenth embodiment, the second integrated circuit 120H includes an I/O section 122E, a timer 123, a storage unit 124, an authentication unit 125, and an encoding unit 510C. These components are identified using the description made in the thirteenth embodiment.

The second integrated circuit 120H further includes a control unit 121H, a switching unit 126, a first communication unit 523, and a second communication unit 524. The wearable terminal 100H may perform communication based on a first communication technology using a combination of the first communication unit 523 and the antenna unit 521. The wearable terminal 100H may perform communication based on a second communication technology using a combination of the second communication unit 524 and the antenna unit 521. The switching unit 126 selects a communication element to be used for communication, from the first communication unit 523 and the second communication unit 524.

The second communication technology ensures that transmission data reaches a wider range than the first communication technology although the second communication technology requires a larger amount of power than the first communication technology. The first communication technology may be exemplified by Bluetooth. The second communication technology may be exemplified by WiFi.

As described with reference to FIG. 18, when the user is at home, the smartphone A, the television set, and the home gateway may be set as communication destinations of the wearable terminal 100H. In this case, when the user is at home and all the smartphone A, the television set, and the home gateway are located largely away from the wearable terminal 100H, the wearable terminal 100H may not be able to appropriately communicate with the smartphone A, the television set, or the home gateway using the first communication technology. Using the second communication technology instead of the first communication technology, the wearable terminal 100H may be able to communicate with at least one of the smartphone A, the television set, and the home gateway.

Figure 20A:
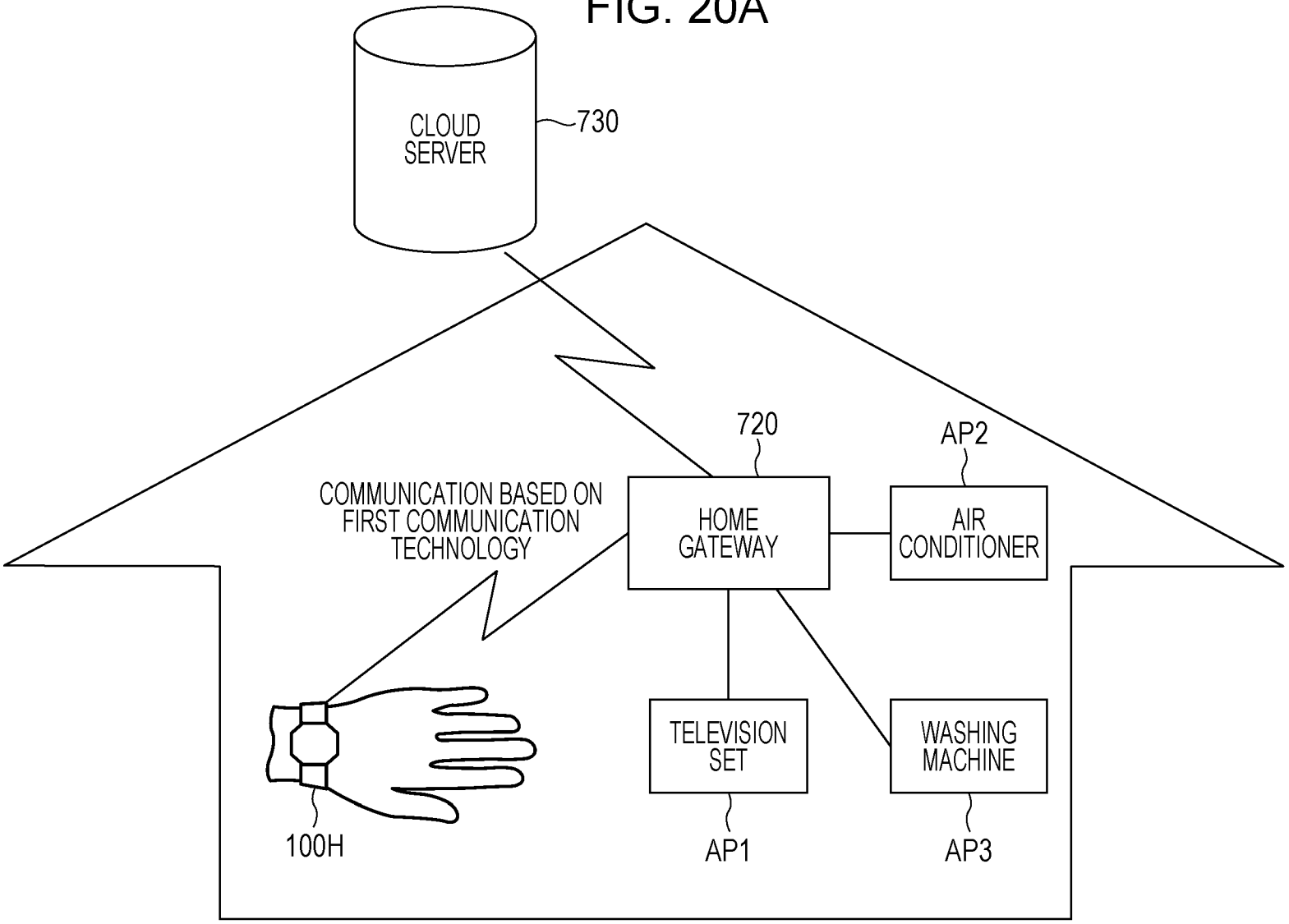
FIG. 20A is a schematic diagram illustrating an illustrative use environment of the wearable terminal illustrated in FIG. 19.
Figure 20B:
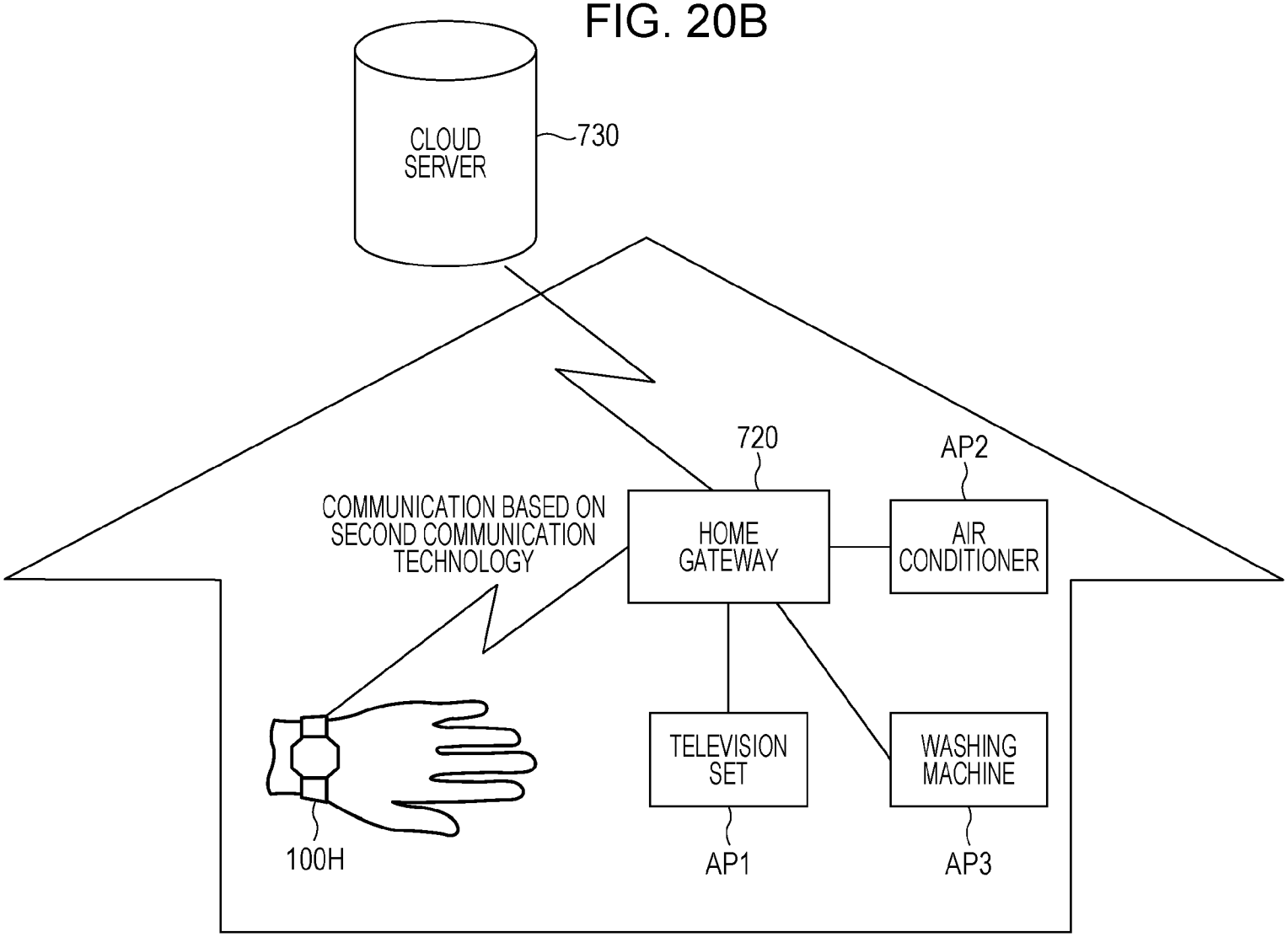
FIG. 20B is a schematic diagram illustrating an illustrative use environment of the wearable terminal illustrated in FIG. 19.

FIG. 20A and FIG. 20B are schematic diagrams illustrating illustrative use environments of the wearable terminal 100H. The switching of the communication technology between the first communication technology and the second communication technology will be described with reference to FIG. 19 to FIG. 20B.

When the power supply unit 600F supplies power to the second integrated circuit 120H, the control unit 121H may generate image data to request the selection of one of the first communication technology and the second communication technology. The image data is output to the display 131 via the I/O section 122E. The display 131 displays an image to request the selection of one of the first communication technology and the second communication technology using the image data. The user operates the touch panel 132 and selects one of the first communication technology and the second communication technology. Information indicating the selected communication technology is output from the touch panel 132 to the control unit 121H via the I/O section 122E.

If the user selects the first communication technology, the control unit 121H controls the switching unit 126 to transmit the transmission data from the first communication unit 523. This allows the wearable terminal 100H to transmit the transmission data to the home gateway 720 without consuming a large amount of power.

If the user selects the second communication technology, the control unit 121H controls the switching unit 126 to transmit the transmission data from the second communication unit 524. This allows the home gateway 720 located largely away from the wearable terminal 100H to receive the transmission data.

The selection of the communication technology may not necessarily be dependent on the user operation. The control unit 121H may automatically switch the communication technology in accordance with the communication state. For example, if the control unit 121H determines that communication is not possible under the first communication technology or if the control unit 121H detects an interruption of communication under the first communication technology, the switching unit 126 may automatically select the second communication technology. Alternatively, the control unit 121H determines that communication is not possible under the first communication technology or if the control unit 121H detects an interruption of communication under the first communication technology, the user may be prompted to switch the communication technology through the display 131. The basic concept of this embodiment is not limited to a specific method for switching the communication technology.

The control unit 121H may limit the use period of the second communication technology using the timer 123, if necessary. In this case, the wearable terminal 100H may not have excessively high power consumption.

Seventeenth Embodiment

A wearable terminal may access a cloud server without using a relay device such as a smartphone. In a seventeenth embodiment, a wearable terminal configured to access a cloud server without using a relay device such as a smartphone will be described.

Figure 21:
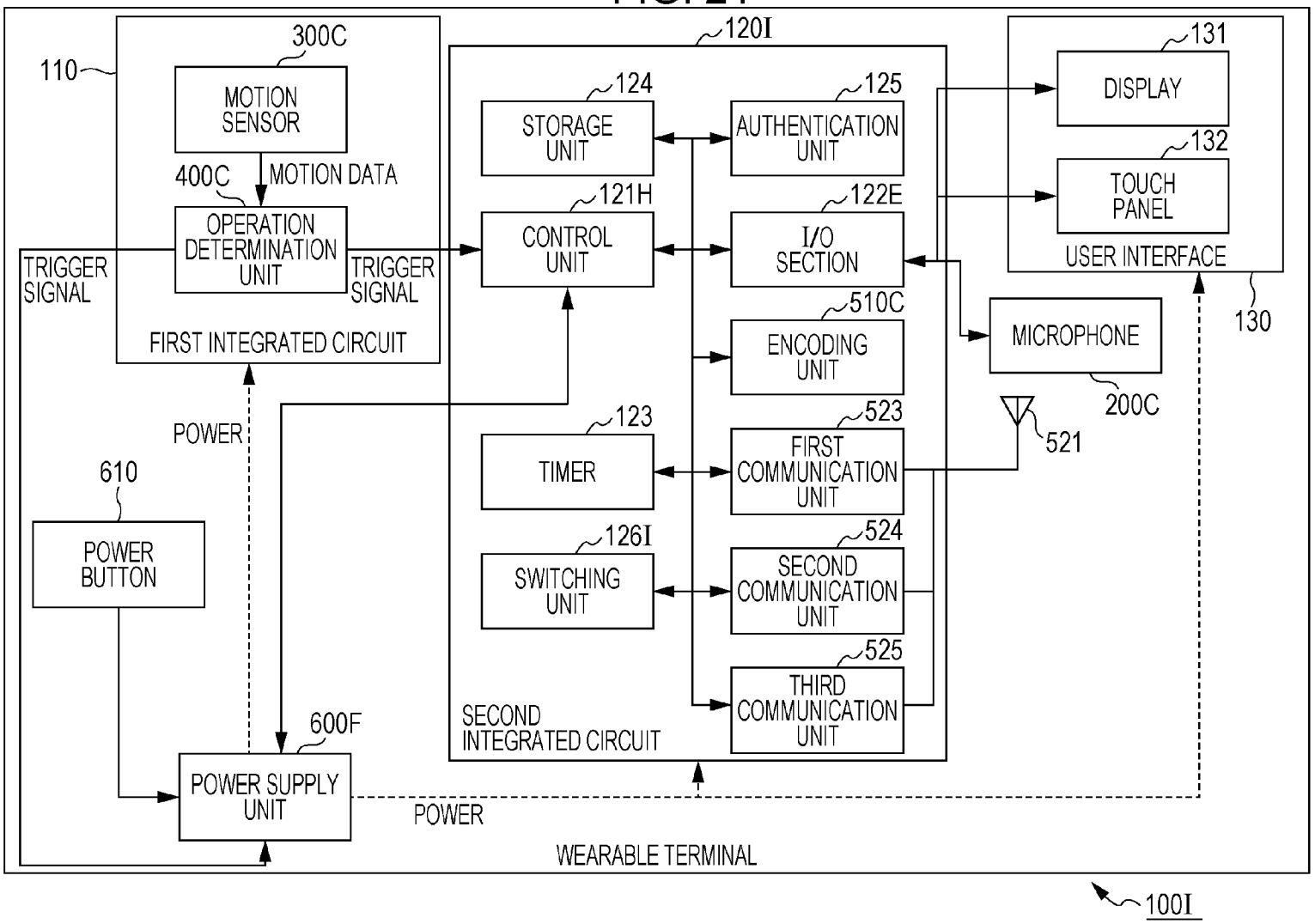
FIG. 21 is a schematic block diagram of a wearable terminal according to a seventeenth embodiment.

FIG. 21 is a schematic block diagram of a wearable terminal 100I according to the seventeenth embodiment. The wearable terminal 100I will be described with reference to FIG. 21. Numerals common to the sixteenth embodiment and the seventeenth embodiment designate components having substantially the same features. Thus, these components are identified using the description made in the sixteenth embodiment.

Similarly to the sixteenth embodiment, the wearable terminal 100I includes a first integrated circuit 110, a user interface 130, a microphone 200C, an antenna unit 521, a power supply unit 600F, and a power button 610. These components are identified using the description made in the sixteenth embodiment.

The wearable terminal 100I further includes a second integrated circuit 120I. Similarly to the sixteenth embodiment, the second integrated circuit 120I executes processes such as generation of transmission data, control of the user interface 130, user authentication, and the switching of the communication technology. The processing operation described in connection with the sixteenth embodiment is used to indicate the operation of the second integrated circuit 120I.

Similarly to the sixteenth embodiment, the second integrated circuit 120I includes a control unit 121H, an I/O section 122E, a timer 123, a storage unit 124, an authentication unit 125, an encoding unit 510C, a first communication unit 523, and a second communication unit 524. These components are identified using the description made in the sixteenth embodiment.

The second integrated circuit 120I further includes a switching unit 126I and a third communication unit 525. The switching unit 126I selects a communication element to be used for the transmission of the transmission data, from the first communication unit 523, the second communication unit 524, and the third communication unit 525 under control of the control unit 121H.

When the switching unit 126I selects the third communication unit 525, the wearable terminal 100I performs communication based on a third communication technology. The third communication technology ensures that transmission data reaches a wider range than the second communication technology although the third communication technology requires a larger amount of power than the second communication technology. The third communication technology may be exemplified by 3G.

When the switching unit 126I selects the third communication unit 525, the wearable terminal 100I can deliver the transmission data to a cloud server without using a relay communication device such as a smartphone. Thus, a user who is away from home may be able to have remote control of a home electric appliance without carrying a smartphone with them.

Eighteenth Embodiment

The user may give voice instructions to a wearable terminal to control not only a home electric appliance but also other devices. For example, if the user is able to have remote control of a smartphone by giving voice instructions to a wearable terminal, the user will be able to cause the smartphone to operate without taking the smartphone out of the bag. In an eighteenth embodiment, a wearable terminal configured to allow remote control of not only a home electric appliance but also other devices will be described.

Figure 22:
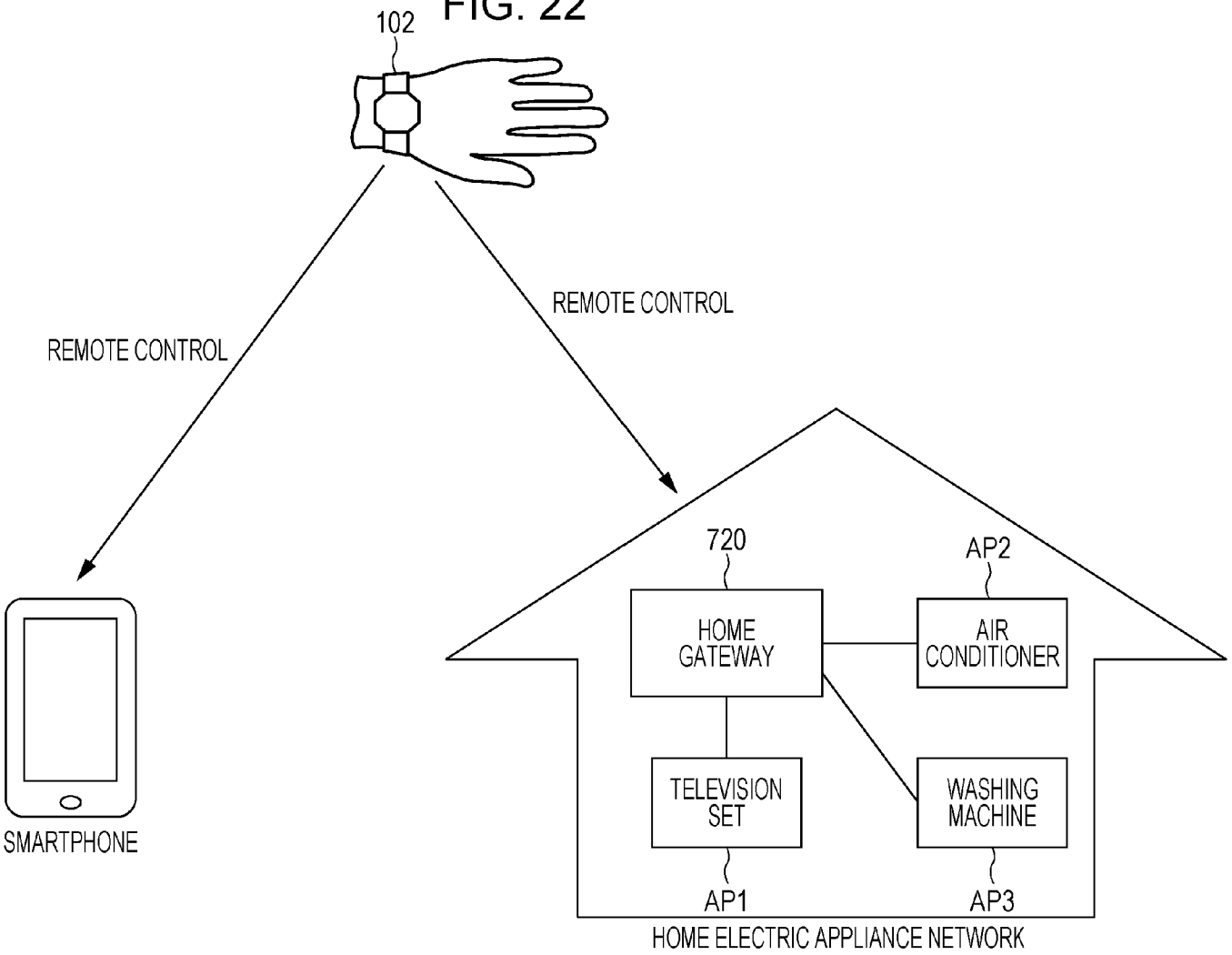
FIG. 22 is a schematic diagram illustrating an illustrative use environment of a wearable terminal according to an eighteenth embodiment.

FIG. 22 is a schematic diagram illustrating an illustrative use environment of a wearable terminal 102 according to the eighteenth embodiment. The wearable terminal 102 will be described with reference to FIG. 22.

Similarly to the various embodiments described above, the user is able to have remote control of a home electric appliance network by giving voice instructions to the wearable terminal 102. Accordingly, the techniques for remote control of a home electric appliance network described in connection with the various embodiments described above are applicable to the wearable terminal 102.

Unlike the various embodiments described above, the user is able to have remote control of a smartphone by giving voice instructions to the wearable terminal 102. A technique for generating transmission data for the remote control of a smartphone may be the same as a technique for generating transmission data for the remote control of a home electric appliance network.

When giving voice instructions, the user may have to say the name of the target device subject to remote control. In this case, giving voice instructions may bother the user. The technique for setting priorities described in connection with the fifteenth embodiment contributes to overcoming a bothersome feeling that the user may experience.

Figures 23, 24:
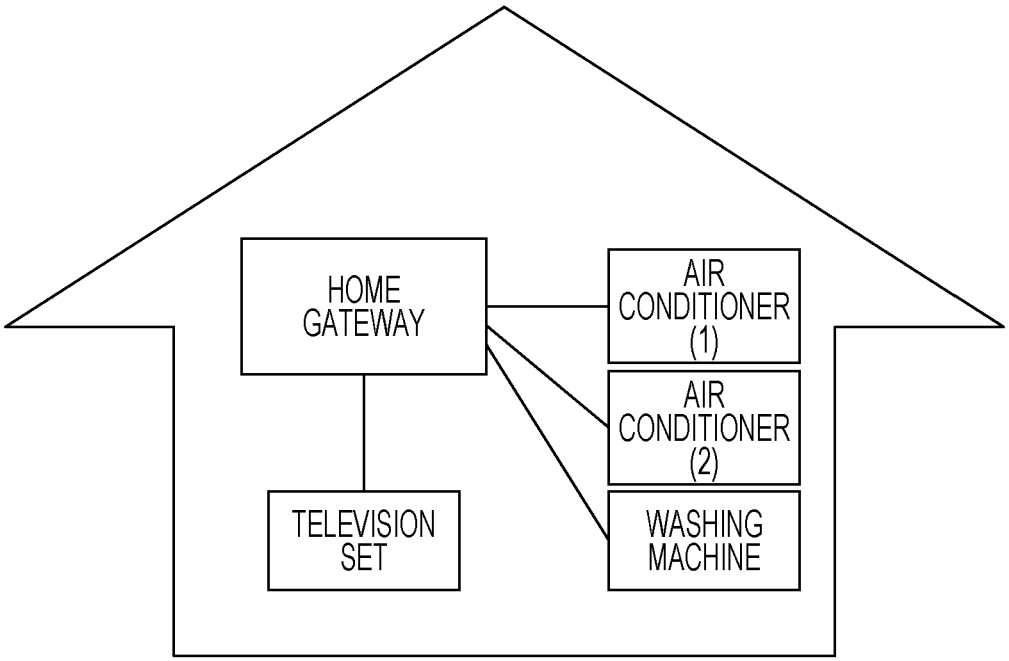
FIG. 23 is a table showing priorities set in a cloud server that communicates with the wearable terminal illustrated in FIG. 22.
FIG. 24 is a schematic diagram illustrating home electric appliances that the user possesses (nineteenth embodiment)

FIG. 23 is a table showing priorities set in a cloud server. The technique for remote control of home electric appliances and a smartphone will be described with reference to FIG. 22 and FIG. 23.

In the cloud server, a higher priority is given to a home electric appliance network than to a smartphone. As described in connection with the fifteenth embodiment, the user may operate the wearable terminal 102 to change the setting of the priorities.

If the voice instructions given by the user do not include the name of a target device subject to remote control, in the setting of priorities illustrated in FIG. 23, a cloud server determines that the voice instructions are given to a home electric appliance network. Thus, the user may only be required to give voice instructions including the word "smartphone" only when they wish to have remote control of a smartphone.

If the voice instructions given by the user do not include the word "smartphone" but include the function unique to a smartphone (e.g., taking photographs), the cloud server may determine that the voice instructions have been given to a smartphone.

Nineteenth Embodiment

The user may possess a plurality of home electric appliances of the same type. In a case where the user possesses two air conditioners, if the user gives voice instructions that include the words "air conditioner", it will be difficult for the cloud server to determine which of the two air conditioners the user wishes to have remote control of.

The two air conditioners may be assigned unique names. In this case, the user has to learn and memorize the unique names assigned to the two air conditioners. This may bother the user. In a nineteenth embodiment, a wearable terminal configured to enable appropriate remote control of a plurality of home electric appliances of the same type will be described.

FIG. 24 is a schematic diagram illustrating home electric appliances possessed by a user. A technique for appropriate remote control of a plurality of home electric appliances of the same type will be described with reference to FIG. 24.

The user possesses a home gateway, a television set, a washing machine, an air conditioner (1), and an air conditioner (2). In existing techniques, remote control of the air conditioner (1) and the air conditioner (2) is likely to experience the problems described above. The technique for setting priorities described in connection with the fifteenth embodiment contributes to overcoming the problems described above.

FIG. 25 is a table showing priorities set in a cloud server. The technique for remote control of home electric appliances and a smartphone will be described with reference to FIG. 24 and FIG. 25.

Similarly to the fifteenth embodiment, the cloud server is configured to determine where the user is. The user is configured to set a priority for each location.

While the user is away from home, "the air conditioner (1)" is one of the targets of remote control, whereas "the air conditioner (2)" is not a target of remote control. Thus, when determining that the user is away from home, the cloud server can appropriately select "the air conditioner (1)" as a target of control.

While the user is at home, "the air conditioner (2)" is one of the targets of remote control, whereas "the air conditioner (1)" is not a target of remote control. Thus, when determining that the user is at home, the cloud server can appropriately select "the air conditioner (2)" as a target of control.

The user can set priorities in accordance with their own daily activities. If the user does not frequently use the washing machine, the user may remove the washing machine from the target of remote control.

Twentieth Embodiment

A wearable terminal, a communication device responsible for the relay of data between the wearable terminal and a cloud server, and a home electric appliance may be designed to be capable of operating under control of the cloud server. In this case, the cloud server preferably determines a target of control on the basis of the operation performed by the user. In a twentieth embodiment, a technique for determining a target of control on the basis of the operation performed by the user will be described.

FIG. 26 is a table for associating targets to be controlled by a cloud server and operations performed by the user. The technique for determining a target of control on the basis of the operation performed by the user will be described with reference to FIG. 26.

When the user operates a power button of a wearable terminal and starts supplying power to the wearable terminal, the cloud server may determine that the subsequent control instructions are given to the wearable terminal.

When the user operates a touch panel of a smartphone, the cloud server may determine that the subsequent control instructions are given to the smartphone.

When the user moves the upper limb on which the wearable terminal is worn, the cloud server may determine that the subsequent control instructions are given to a home electric appliance.

The basic concepts of the various embodiments described above may be used in combination to meet the request for the control of a home electric appliance.

The basic concept of the embodiments described above is suitable for use in the control of a home electric appliance.

What is claimed is:

1. A [wearable] terminal configured to be [wearable on an upper limb of a user and] usable in a system for allowing remote control of a [home electric appliance] *device* via a network by using voice instructions, the [wearable] terminal comprising:

a voice data [generation unit configured to generate audio data from the voice instructions] *generator*;

a [sensing unit configured to sense a motion of the upper limb in a first axis direction perpendicular to a plane defined by (i) a second axis direction extending in a vertically downward oriented direction of the upper limb and (ii) a third axis direction extending in a direction of movement of the user and being perpendicular to the second axis direction, and to generate motion data concerning the motion;

a determination unit configured to determine, based on the motion data, whether or not the user is going to perform remote control of the home electric appliance; and a data processing unit configured to process the audio data, the data processing unit including (i) a transmission data generation unit configured to generate transmission data corresponding to the audio data in a case where the determination unit determines that the user is going to perform remote control of the home electric appliance, and (ii) a transmission unit configured to transmit the transmission data to the network.] *sensor wearable on an upper limb of a user, the sensor being configured to generate motion data after detection of motion of the upper limb, the motion data including*

*acceleration data indicating an acceleration of the upper limb in a first axis direction extending away from the user, the first axis direction being perpendicular to a plane defined by (i) a second axis direction extending in a vertically downward oriented direction of the upper limb and (ii) a third axis direction extending in a travelling direction of the user and being perpendicular to the second axis direction, and*

*angular velocity data indicating an angular velocity of a rotational motion of the upper limb around the second axis; and*

*a processor configured to*

*determine whether or not the acceleration of the upper limb in the first axis direction is larger than an acceleration threshold,*

*determine whether or not a rotation angle calculated from the angular velocity data is larger than a rotation angle threshold,*

*cause the voice data generator to generate audio data from the voice instructions, when (i) the motion of the upper limb is detected, (ii) the acceleration of the upper limb in the first axis direction is determined to be larger than the acceleration threshold, and (iii) the rotation angle calculated from the angular velocity data is determined to be larger than the rotation angle threshold, the voice instructions being inputted by the user, and*

*start a processing of the generated audio data.*

[2. The wearable terminal according to claim 1, wherein the motion data indicates an acceleration of the upper limb in the first axis direction, and when the acceleration is larger than an acceleration threshold, the determination unit determines that the user is going to perform remote control of the home electric appliance.]

[3. The wearable terminal according to claim 2, wherein the sensing unit is configured to sense an angular velocity of a rotational motion of the upper limb about the second axis extending in the vertically downward oriented direction of the upper limb, and to generate angular velocity data indicating the angular velocity as the motion data, and the determination unit determines that the user is going to perform remote control of the home electric appliance when a rotation angle of the upper limb calculated from the angular velocity data is larger than the rotation angle threshold.]

4. The [wearable] terminal according to claim 1, further comprising a power [supply unit] *supplier* configured to supply power to the [data processing unit] *processor*, wherein

[in a case where the determination unit determines that the user is going to perform remote control of the home electric appliance,] the power [supply unit] *supplier* starts supplying the power to [the data processing unit] *processor, on receiving the trigger signal*.

5. The [wearable] terminal according to claim 1, wherein the second axis direction extends along the upper limb, from shoulder to fingertip when the upper limb is extended, in the vertically downward oriented direction of the upper limb, and the third axis direction extends in a direction across a hand of the user perpendicular to the second axis direction.

6. A method for controlling a [wearable] terminal, *with a sensor wearable to an upper limb of a user,* configured to be [wearable on an upper limb of a user and] usable in a system for allowing remote control of a [home electric appliance] *device* via a network by using voice instructions, the method comprising:

[a sensing step of sensing a motion of the upper limb in a first axis direction perpendicular to a plane defined by (i) a second axis direction extending in a vertically downward oriented direction of the upper limb and (ii) a third axis direction extending in a direction of movement of the user and being perpendicular to the second axis direction, and generating motion data concerning the motion;

a determination step of determining, based on the motion data, whether or not the user is going to perform remote control of the home electric appliance;

a generation step of receiving the voice instructions and generating transmission data corresponding to the voice instructions in a case where it is determined in the determination step that the user is going to perform remote control of the home electric appliance; and a transmission step of transmitting the transmission data to the network.]

*generating motion data after detection of motion of the upper limb, the motion data including*

*acceleration data indicating an acceleration of the upper limb in a first axis direction extending away from the user, the first axis direction being perpendicular to a plane defined by (i) a second axis direction extending in a vertically downward oriented direction of the upper limb and (ii) a third axis direction extending in a travelling direction of the user and being perpendicular to the second axis direction, and*

*velocity data indicating an angular velocity of a rotational motion of the upper limb around the second axis;*

*determining whether or not the acceleration of the upper limb in the first axis direction is larger than an acceleration threshold;*

*determining whether or not a rotation angle calculated from the angular velocity data is larger than a rotation angle threshold;*

*causing the voice data generator to generate audio data from the voice instructions, when (i) the motion of the upper limb is detected, (ii) the acceleration of the upper limb in the first axis direction is determined to be larger than the acceleration threshold, and (iii) the rotation angle calculated from the angular velocity data is*

*determined to be larger than the rotation angle threshold, the voice instructions being inputted by the user; and*

*starting a processing of the generated audio data.*

[7. The method according to claim 6, wherein the sensing step includes sensing an acceleration of the upper limb in the first axis direction, and the determination step includes comparing the acceleration with an acceleration threshold, and determining that the user is going to perform remote control of the home electric appliance when the acceleration is larger than the acceleration threshold.]

[8. The method according to claim 7, wherein the sensing step includes sensing an angular velocity of a rotational motion of the upper limb about the second axis extending in the vertically downward oriented direction of the upper limb, and the determination step includes comparing a rotation angle of the upper limb calculated using the angular velocity with a rotation angle threshold, and determining that the user is going to perform remote control of the home electric appliance if the rotation angle is larger than the rotation angle threshold.]

9. The method according to claim 6, wherein the second axis direction extends along the upper limb, from shoulder to fingertip when the upper limb is extended, in the vertically downward oriented direction of the upper limb, and the third axis direction extends in a direction across a hand of the user perpendicular to the second axis direction.

*10. The terminal according to claim 1, wherein*

*a power supplier stops supplying the power to the processor, when a predetermined period elapses after the power supplier starts supplying the power to the processor.*

*11. The terminal according to claim 1, wherein*

*the processor is further configured to generate transmission data corresponding to the generated audio data, and to transmit the transmission data to the network.*

*12. The terminal according to claim 1, wherein*

*the terminal is a wearable terminal.*

*13. The terminal according to claim 1, further comprising a display configured to display information to the user, wherein*

*the processor generates display data that indicates that the terminal becomes available to receive voice instructions, when the value of the motion in the first axis direction is determined to exceed the threshold, and the display displays the generated display data.*

*14. A wearable terminal configured to be wearable on an upper limb of a user and usable in a system for allowing remote control of a home electric appliance via a network by using voice instructions, the wearable terminal comprising:*

*a voice data generator;*

*a sensor wearable on the upper limb of the user, the sensor being configured to generate motion data after detection of motion of the upper limb, the motion data including*

*acceleration data indicating an acceleration of the upper limb in a first axis direction extending away from the user, the first axis direction being perpendicular to a plane defined by (i) a second axis direction extending in a vertically downward oriented direction of the upper limb and (ii) a third axis direction extending in a travelling direction of the user and being perpendicular to the second axis direction, and*

*angular velocity data indicating an angular velocity of a rotational motion of the upper limb around the second axis; and*

*a processor configured to*

*after the motion of the upper limb is detected, determine whether or not the user is going to perform remote control of the home electric appliance by (i) determining whether or not the acceleration of the upper limb in the first axis direction is larger than an acceleration threshold, and (ii) determining whether or not a rotation angle calculated from the angular velocity data is larger than a rotation angle threshold,*

*cause the voice data generator to generate audio data from the voice instructions, when it is determined that the user is going to perform remote control of the home electric appliance, the voice instructions being inputted by the user,*

*start a processing of the generated audio data, and*

*generate transmission data corresponding to the generated audio data, and*

*transmit the transmission data to the network.*

* * * * *